(12) United States Patent
Miyashita et al.

(10) Patent No.: US 8,766,980 B2
(45) Date of Patent: Jul. 1, 2014

(54) INFORMATION MANAGEMENT SYSTEM, METHOD AND PROGRAM

(75) Inventors: Hisashi Miyashita, Kanagawa (JP); Hiroaki Nakamura, Kanagawa (JP); Kohei Suenaga, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/180,750

(22) Filed: Jul. 12, 2011

(65) Prior Publication Data

US 2012/0019535 A1    Jan. 26, 2012

(30) Foreign Application Priority Data

Jul. 23, 2010 (JP) ................................. 2010-165620

(51) Int. Cl.
*G06T 11/20* (2006.01)
*G09G 5/00* (2006.01)

(52) U.S. Cl.
USPC ............................. 345/440; 345/441; 345/661

(58) Field of Classification Search
None
See application file for complete search history.

(56) References Cited

U.S. PATENT DOCUMENTS 6,304,892 B1 * 10/2001 Bhoj et al. .................... 709/202
2004/0172237 A1 * 9/2004 Saldanha et al. ................ 704/4

FOREIGN PATENT DOCUMENTS

| JP | 2000090091 A | 3/2000 |
| JP | 2001-014166 A | 1/2001 |
| JP | 2001-022781 A | 1/2001 |
| JP | 2003-141139 A | 5/2003 |
| JP | 2003-271599 A | 9/2003 |
| JP | 2005339119 A | 12/2005 |

* cited by examiner

*Primary Examiner* — Ke Xiao
*Assistant Examiner* — Robert Craddock
(74) *Attorney, Agent, or Firm* — Cantor Colburn LLP

(57) ABSTRACT

A method for constructing relation information between data elements in a directed acyclic graph (DAG) in first and second domains includes importing data from the first domain DAG and data from the second domain DAG to generate a relation graph; responsive a relation between a node $v_a$ of the first domain DAG and a node $v_b$ of the second domain DAG, generating a join node between $v_a$ and $v_b$ in the relation graph, the join node linking a node upstream of $v_a$ in the DAG to a node upstream of $v_b$ in the DAG; if there is a pair of $v_a$ of the first domain DAG and $v_b$ of the second domain DAG that do not have a join node, generating a join node v between $v_a$ and $v_b$ in the relation graph, and generating an edge $(v_a, v)$ and an edge $(v_b, v)$ in the relation graph.

6 Claims, 24 Drawing Sheets

Figure 9

| SOURCE | TARGET | LINK TYPE |
|---|---|---|
| SA : Satellite | Rh : Satellite | Contain |
| SA : Cooler | Rh : Cooler | Satisty |
|  |  |  |
|  |  |  |

— 902

ADD LINK — 904

CREATE

| SOURCE TOOL | SA ▼ |
|---|---|
| SOURCE ELEMENT | Cooler ▼ |
| TARGET TOOL | Rh ▼ |
| TARGET ELEMENT | Detector ▼ |
| LINK TYPE | Contain ▼ |
|  | Contain ∧ |
|  | Satisfy ∨ |

INFORMATION MANAGEMENT SYSTEM, METHOD AND PROGRAM

PRIORITY

This application claims priority to Japanese Patent Application No. 2010-165620, filed 23 Jul. 2010, and all the benefits accruing therefrom under 35 U.S.C. §119, the contents of which in its entirety are herein incorporated by reference.

FIELD OF THE INVENTION

The present invention generally relates to an information management system and, in particular, to an information management system, method and program for managing association between pieces of information located in different domains.

BACKGROUND

In areas such as automobile, electric machinery, and aerospace and defense areas, many domains (departments) such as mechanical, electric, systems design, software and test departments are involved in developing a particular product because products are complex and made up of many parts. While such many departments are involved, pieces of data across the domains need to be associated with each other since they need to collaborate to ultimately produce an integrated product.

FIG. 1 is a diagram illustrating an example of collaboration among different domains at an automobile manufacturer. It can be seen from FIG. 1 that data from different domains, namely systems model, request management, control analysis, CAD, electric/electronic circuit, and parts configuration management, and embedded software domains, are associated with one another.

However, data are associated across domains ad hoc at present, which makes it difficult to ensure centralized traceability and impact analysis of entire products.

One of the causes of the difficulty is that experts in different domains use different tools. To resolve the problem, a standardized tool may be used across the domains. However, it is difficult in reality to standardize tools across the domains because experts in the domains have a strong desire to use their familiar tools and different domains require tools with different functions.

Therefore, there is demand for a technique to enable information within each individual domain to be managed with an existing tool and enable only information relating to various domains to be centrally managed to present a view of an entire product across the domains, thereby facilitating collaboration among experts. FIG. 2 generally illustrates such a demanded view. That is, an association information management function 210 is demanded that provides a view 212 of information associating pieces of information from domains 202, 204, 206 and 208 as illustrated in FIG. 2.

FIG. 3 in particular illustrates association of information from two domains in further detail. A request management domain 302 has data elements A1 through A11 structured in the form of a directed acyclic graph (DAG). A systems model domain 304 has data elements B1 through B6 also structured in the form of a directed acyclic graph.

In this way, data are structured in DAGs in two domains and stored in storage devices of computers of the domains so as to be accessed electronically and individually. An operator, preferably an expert, can operate another computer preferably connected to the computers of the two domains through a network to generate a view of association between data elements of the two domains on that computer. The view is illustrated as a relationship hub 306 in FIG. 3 and in practice is a part of the view 212 of the association information illustrated in FIG. 2.

Such association through operation by an operator can visualize association between domains. However, it is difficult to determine whether or not associations generated by operations by the operator are exhaustive or appropriate because the amounts of data in the domains are huge.

A technique disclosed in Japanese Patent Laid-Open No. 2000-90091 aims to allow a user of information represented as a directed ordered tree to give an criterion relating to a structure of the information to extract a substructure that matches the criterion without needing precise knowledge about the structure of the information. When a search criterion that defines a content of a node that makes up the directed ordered tree and a relation between nodes is input, matching means deletes an intermediate node in a directed ordered tree of information 1a to be processed stored in information storage means 1, performs an operation to relocate a node string immediately below the intermediate node to the position where the intermediate node was positioned to generate a homogenized directed ordered tree, and extracts a directed ordered tree in the homogenized directed ordered tree that meets the search criterion. Thus, the technique enables the use of a search criterion that uses relation between nodes in searching across many items of information that have different logical structure.

However, the technique disclosed in Japanese Patent Laid-Open No. 2000-90091 does not provide criteria for determining appropriateness of the relation between nodes.

SUMMARY

Therefore it is an object of the present invention to provide a technique that enables a criterion for determining appropriateness of association between pieces of information from two domains to be provided.

It is another object of the present invention to provide a method for automatically providing potential association between two domains.

A system of the present invention is implemented preferably by a computer for displaying association view that is connected to computers of multiple domains.

An operator of the computer for displaying association view first import data from the computers of the domains through a network. The imported data reflects hierarchical relationship of the original data to form a DAG for each domain.

The operator of the computer for displaying association view then inputs a correspondence between nodes of the DAG of each domain through the use of a GUI tool. Input correspondence information is stored on the computer for displaying association view.

Once associations between data in the DAGs of the domains have been constructed, a processing module according to the present invention repeats the following process as long as there is a node va of one domain and a node vb of another domain that do not have a join node.

Generating a join node v between $v_a$ and $v_b$

Generating edges $(v_a, v)$ and $(v_b, v)$

A graph generated as a result of the process is displayed as an association graph as appropriate.

Herein, a join node between $v_a$ and $v_b$ is expressed by $v_a \vee v_b$, which is z that satisfies $z \leq Y$ for every $y \in V$ that satisfies $v_a \leq z$, $v_b \leq z$ and $v_a \leq y$, $v_b \leq y$.

In the association graph, $z \leq Y$ also indicates that there is a series of edges continues from z to y.

A join node can be said to be a node that links nodes positioned upstream of nodes $v_a$ and $v_b$ in the DAG.

As a result, an association DAG made up of nodes corresponding to the original associations and generated join nodes is provided.

Since the association graph, which is the DAG generated as a result of the process described above, is an abstraction of the structure of data of each domain, one can understand the meaning of an association without referring to data of each domain.

Since potential associations are extracted by using the algorithm to generate join nodes, the number of inputs of associations by a user can be reduced.

Whether an appropriate association is made or not can be checked on the association DAG. For example, if a graph in which one join node that directly reaches all nodes is added is generated, it can be determined that the association is inappropriate.

BRIEF DESCRIPTION OF THE SEVERAL VIEWS OF THE DRAWINGS

FIG. 9 is a diagram illustrating an exemplary GUI for a process providing an association;

FIG. 10 is a diagram illustrating an exemplary GUI for a process providing an association;

DETAILED DESCRIPTION OF THE DRAWINGS

Figure 1:
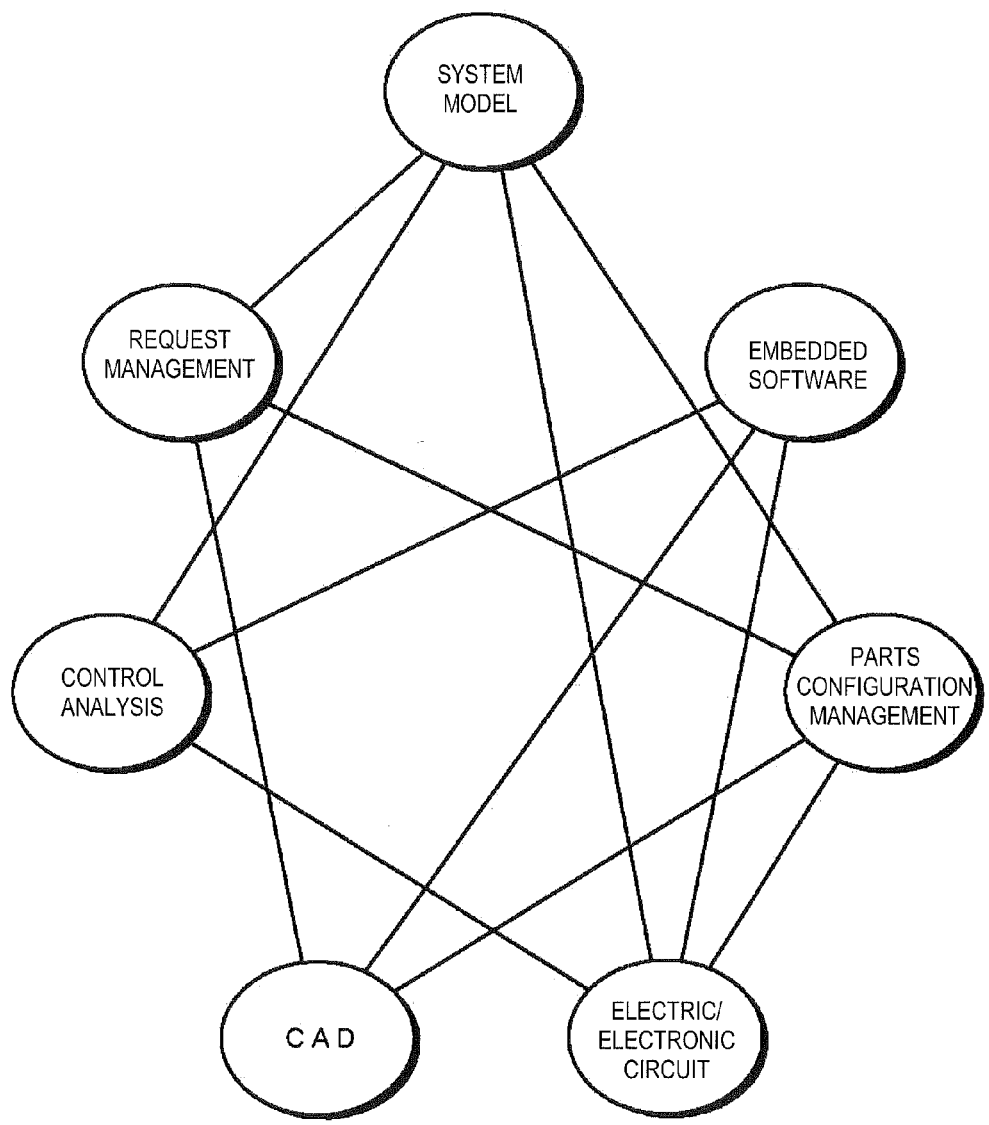
FIG. 1 is a diagram illustrating an example of collaboration among different domains.
Figure 2:
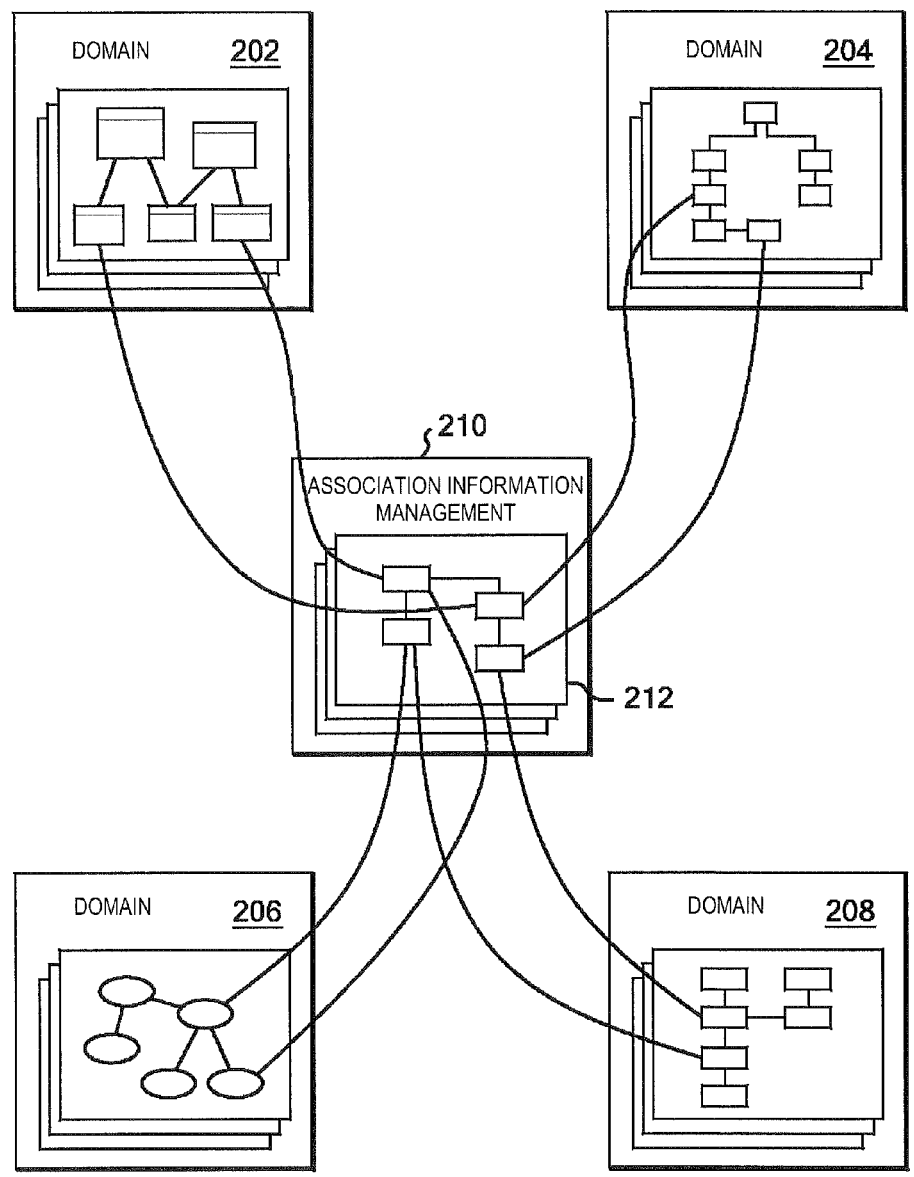
FIG. 2 is a diagram illustrating a view for centrally managing association information among domains.

An embodiment of the present invention will be described with reference to drawings. Like reference numerals denote like elements throughout the drawings unless otherwise stated. It should be understood that the embodiment is illustrative only and is not intended to limit the present invention to specifics described herein.

Figure 4:
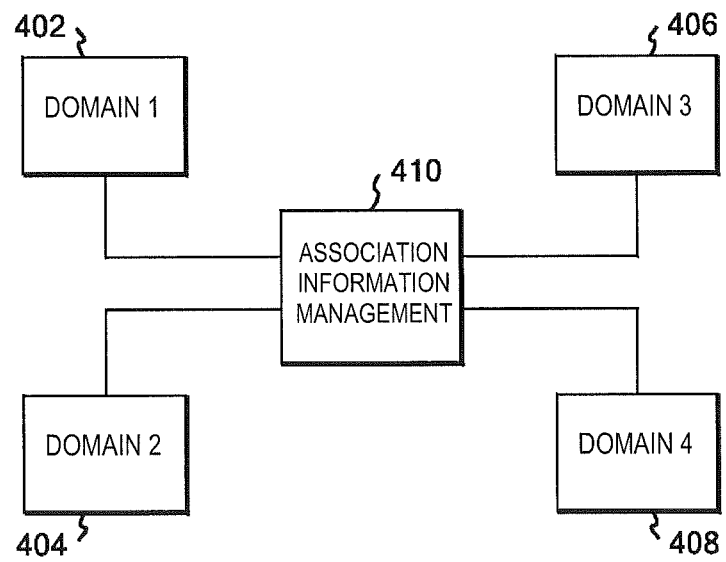
FIG. 4 is a diagram illustrating connections of computers of domain to an association information management computer.

FIG. 4 is a schematic diagram generally illustrating a hardware configuration for carrying out the present invention. Domain 1 402, domain 2 404, domain 3 406 and domain 4 408 in FIG. 4 represent computers of individual domains. Here, the domains individually correspond to domains such as systems model, request management, control analysis, CAD, electric/electronic circuit, parts configuration management, or embedded software domains illustrated with respect to FIG. 1.

A storage device, which is preferably a hard disk drive, of a computer system of each domain stores data specific to a tool used in that domain. The data includes, but not limited to, UML data which is software design data, SysML data which is hardware design data, XML data supported by the tool for data exchange, and data in the electronic design interchange format (EDIF), which is a format for exchanging electronic design data. Other data in a format specific to the tool in the domain may also be stored.

These data may be constructed as a DAG in each domain or may be stored as a graph that is not a DAG, or in a data format that is not a graph.

While only four domains are illustrated by way of example in FIG. 4, there may be more domains or any number of domains. However, at least two domains are required in order to generate association information.

An association information management computer 410 is a computer for generating a view of associations between elements of data and is connected with computers of domain 1 402, domain 2 404, domain 3 406 and domain 4 408 through a network. The association information management computer 410 includes a program having the functions of establishing connections with at least two domains and generating a view of associations between elements of data of the two domains according to operations by an operator. Operations of the program will be described later in detail with reference to flowcharts in FIG. 12 and subsequent figures.

Figure 5:
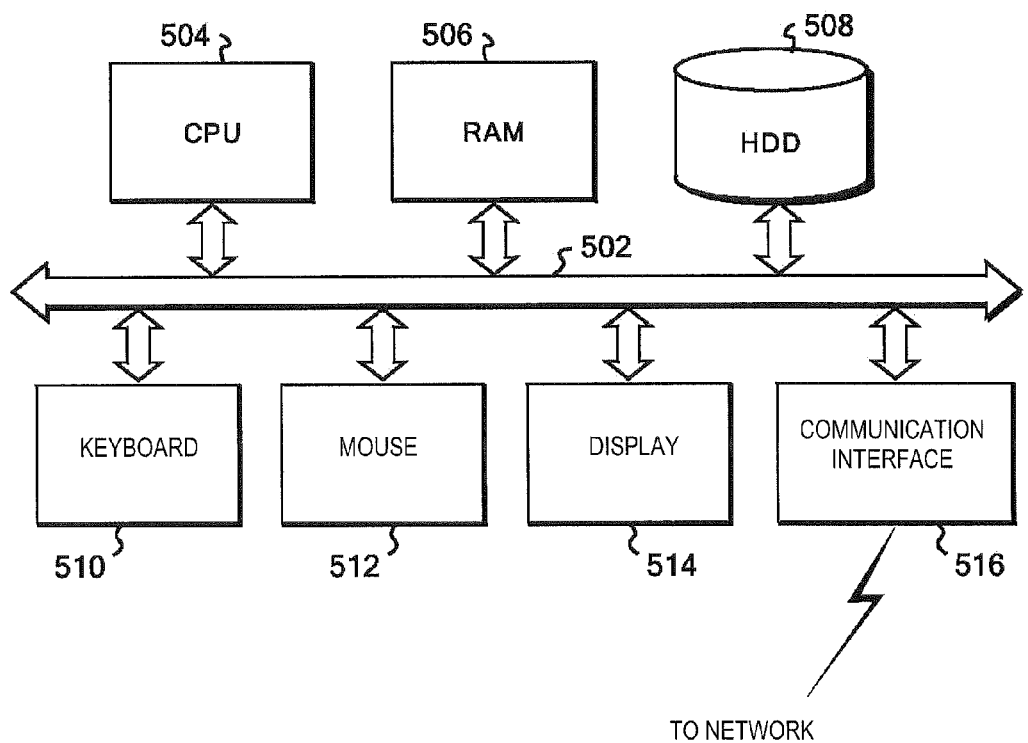
FIG. 5 is a block diagram of a hardware configuration of the association information management computer.

FIG. 5 is a block diagram illustrating a more detailed configuration of the association information management computer 410. It should be understood that the computers of domain 1 402, domain 2 404, domain 3 406 and domain 4 408 have a hardware configuration basically, but not necessarily, similar to this configuration.

In FIG. 5, a CPU 504, a main memory (RAM) 506, a hard disk drive (HDD) 508, a keyboard 510, a mouse 512 and a display 514 are connected onto a system bus 502. The CPU 504 is preferably based on a 32-bit or 64-bit architecture and may be Pentium (trademark) 4, Core (trademark) 2 Duo, or Xeon (trademark) from Intel Corporation, or Athlon (trademark) from Advanced Micro Devices, Inc. The main memory 506 has preferably a capacity of 2 GB or more. The hard disk drive 508 is preferably has a capacity of 320 GB or more.

Although not specifically depicted, an operating system is pre-stored in the hard disk drive 508. The operating system may be any operating system that is compatible with the CPU 504, such as Linux (trademark), Windows (trademark) 7, Windows XP (trademark), or Windows (trademark) 2000 from Microsoft Corporation, or Mac OS (trademark) from Apple Computer, Inc.

Further stored in the hard disk drive 508 are a communication module which provides connection to domains and transfers data to the domains, a graph generation module for constructing a DAG from data transferred from the domains, an association input module for providing a GUI for allowing an operator to input an association between two domains, an association generation module for generating a node and a link between data from two domains based on the input association, and a display module for displaying generated links and nodes on the display 514. These modules can be written using an existing programming language processing system such as C, C++, C#, or Java (R). These modules are loaded onto the main memory 506 as required and executed under the control of the operating system. Operations of the modules will be described in further detail with reference to a functional block diagram in FIG. 6.

The keyboard 510 and the mouse 512 are used by an operator of the association information management computer 410 to operate the association input module and for other operations.

The display 514 is preferably a liquid-crystal display, which may have any resolution such as XGA (1024×768 resolution) or UXGA (1600×1200 resolution), for example. The display 514 is used for displaying data such as a graph generated from a work log.

The system in FIG. 5 is further connected to an external network such as a LAN or WAN through a communication interface 516 connected onto the bus 502. The communication interface 516 communicates with the computers of domain 1 402, domain 2 404, domain 3 406 and domain 4 408 through a medium such as Ethernet (trademark) to exchange data with the computers.

Figure 6:
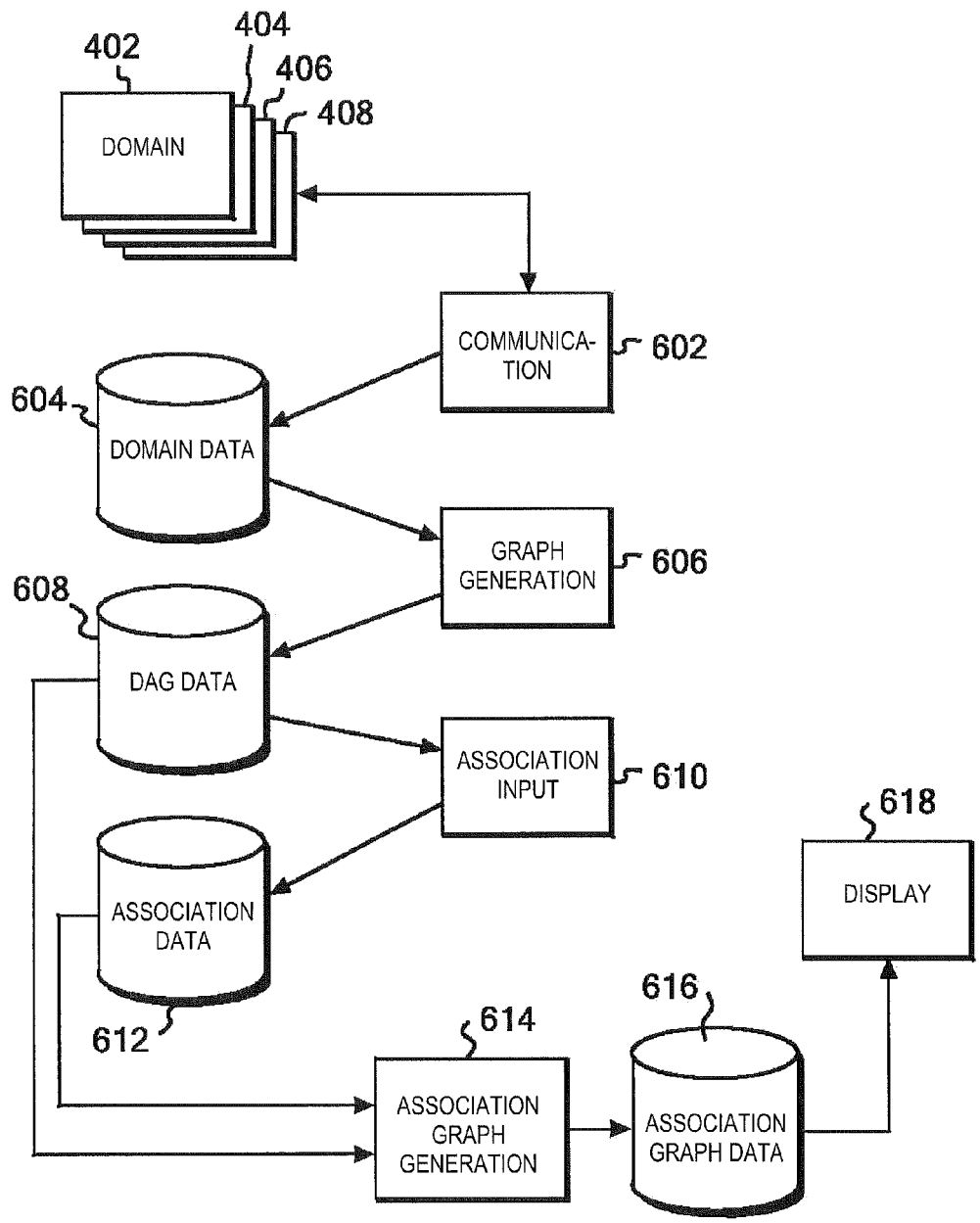
FIG. 6 is a functional block diagram of the association information management computer.

Functional modules primarily stored in the hard disk drive 508 will be described with reference to FIG. 6.

A communication module 602 has the function of communicating with a specified one of the domains 402, 404 406 and 408 through the communication interface 516 using an existing communication protocol such as TCP/IP to transfer a specified portion or all of a group of data used by a tool used in the specified domain, such as a block of UML data, a block of SysML data, an XML file, or EDIF data to the association information management computer 410. A source domain and a tool are specified by an operator operating the association information management computer 410.

The communication module 602 may copy data itself from a specified domain or may copy only link information, such as a URL, alone. The communication module 602 may also copy a file, if any, that describes a hierarchical relation or connection relation of data at the domain. Preferably, the data transferred in this way is temporarily stored in the hard disk drive 508 as domain data 604.

Figure 7:
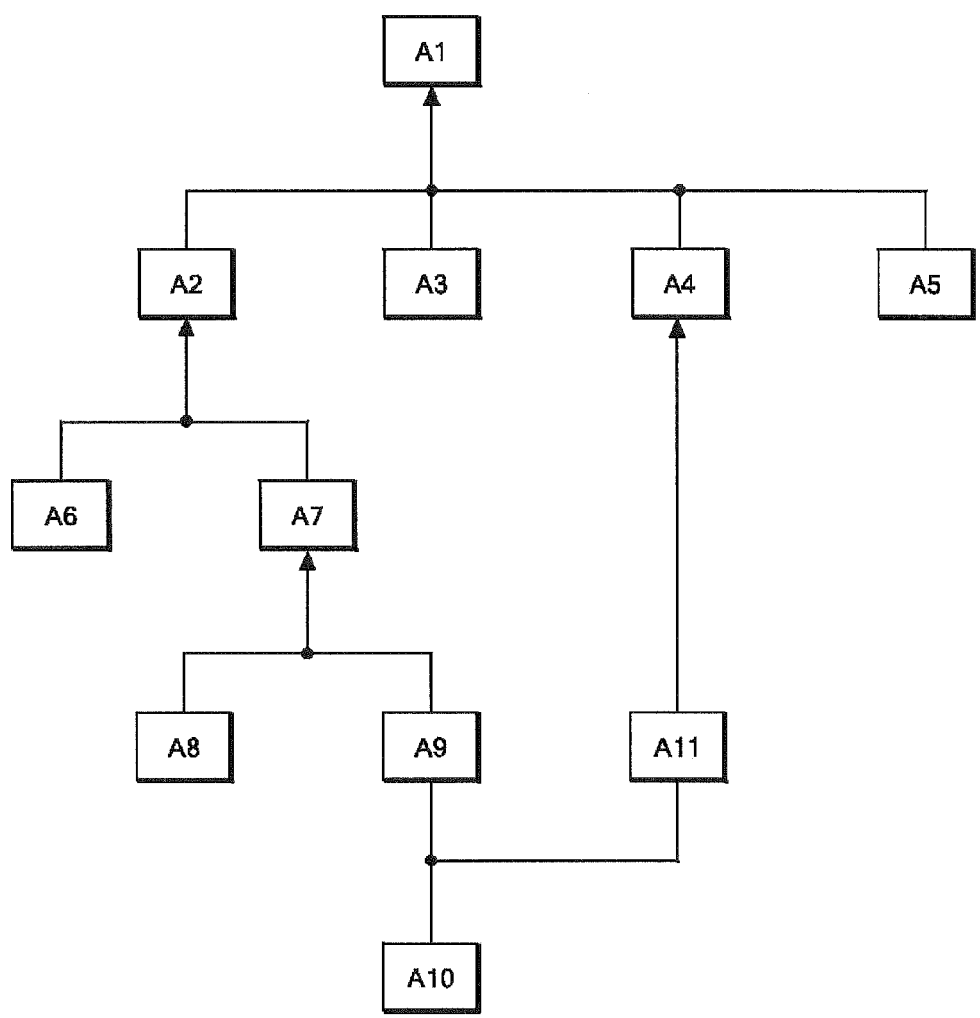
FIG. 7 illustrates an exemplary directed acyclic graph.

A graph generation module 606 generates a directed acyclic graph (DAG) data 608 for each domain from domain data 604 stored in the hard disk drive 508 and preferably stores the DAG data 608 temporarily in the hard disk drive 508 as domain data 608. If there is a file describing a hierarchical relation or connection relation of the data at the domain, information in the file is used in generation of the DAG data 608. Alternatively, the operator of the association information management computer 410 may provide additional data for constructing the DAG on the basis of the operator's own knowledge of knowledge obtained from a person in charge of the domain. FIG. 7 illustrates an example of DAG constructed in this way.

Figure 3:
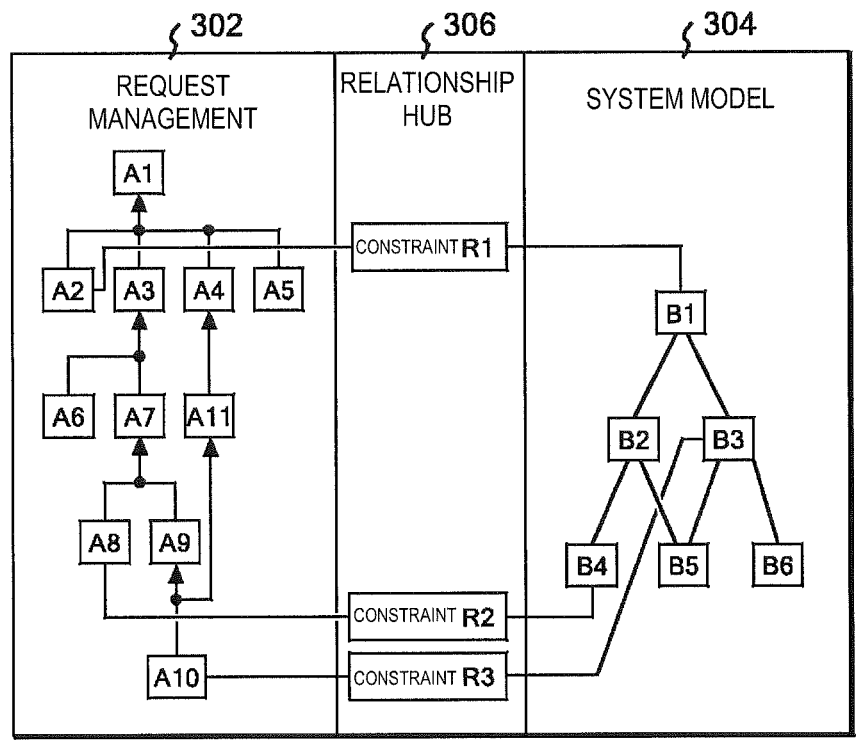
FIG. 3 is a diagram illustrating a view for associating information elements from two domains with each other.

An association input module 610 has the function of allowing the operator to determine on a relation between item of data in a DAG of one domain and an item of data in a DAG of another domain and to store the result in the hard disk drive 508 as association data 612 through an operation by the operator. This basically corresponds to a process for providing relations illustrated in FIG. 3. The process of the association input module 610 and an exemplary GUI screen for the process will be described later with reference to FIGS. 9 to 11.

An association graph generation module 614 refers to DAG data 608 and association data to generate association graph data 616 representing association between two domains according to an algorithm of the present invention and stores the association graph data 616 in the hard disk drive 508. According to the present invention, the association graph data 616 is also a DAG.

A display module 618 has the function of reading data in the association graph data 616 and displaying the data on the display 514.

A process for importing data will be described with reference to the flowchart in FIG. 8. The process for importing data is initiated basically in response to an operation by an operator of the association information management computer 410.

Figure 8:
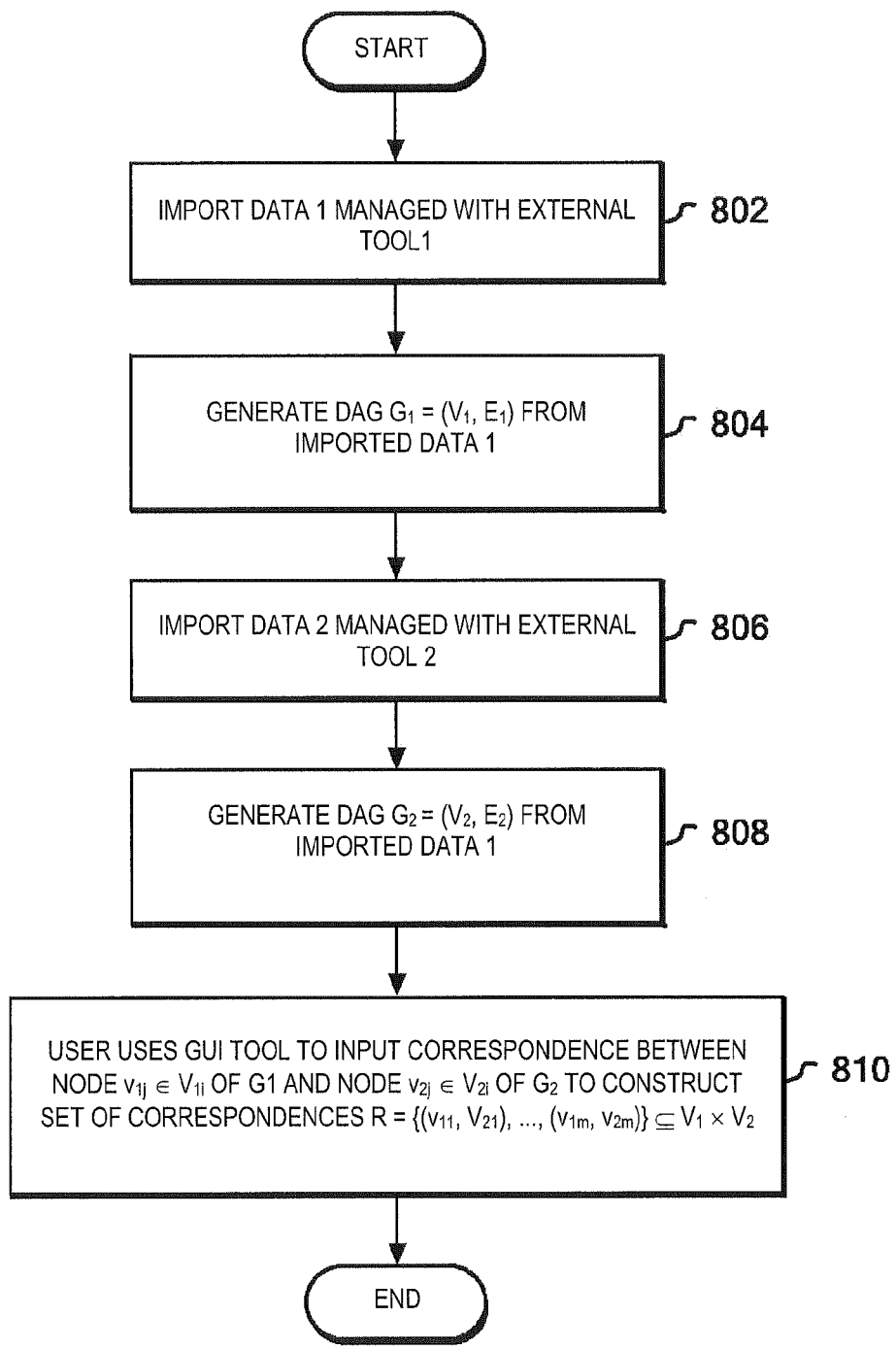
FIG. 8 illustrates a flowchart of a process for importing data from an external tool and providing an association to the data.

At step 802 in FIG. 8, the operator uses the function of the communication module 602 to import data 1 managed with an external tool 1 of domain 1 as domain data 604.

At step 804, the operator uses the function of the graph generation module 606 to generate a directed acyclic graph $G_1=(V_1, E_1)$ from the imported data 1. Here, $V_1$ is a set of nodes and $E_1$ is a set of edges. If the data is a graph, edges are removed according to predetermined rules so as to generate a directed acyclic graph (DAG). If the data is not a graph, a DAG of the data can be created by using partial orders that are the data defined based on attributed values (for example parts numbers).

Then, at step 806, the operator uses the function of the communication module 602 to import data 2 managed with external tool 2 of domain 2 as domain data 604.

At step 808, the operator uses the function of the graph generation module 606 to generates a directed acyclic graph $G_2=(V_2, E_2)$ from the imported data 2.

At step 810, the operator inputs a correspondence between a node $v_{1j} \epsilon V_1$ of $G_1$ and a node $v_{2j} \epsilon V_2$ of $G_2$ through the use of a GUI provided by the association input module 610. The correspondence set $R=\{(v_{11}, v_{21}), \ldots, (v_{1m}, v_{2m})\} \subseteq V_1 \times V_2$ is then constructed.

FIG. 9 illustrates an exemplary GUI screen provided by the association input module 610 and displayed on the display 514.

A tabular view 902 in FIG. 9 includes source, target and link type columns. The source represents given data of a first tool to be associated, the target represents given data of a second tool to be associated, and the link type represents the type of association.

To generate a new association, the operator clicks on an Add button 904 with the mouse 512.

In response, the association input module 610 displays a screen illustrated in FIG. 10. As illustrated, the screen in FIG. 10 includes combo boxes named as source tool, source element, target tool, target element, and link type.

The source tool specifies a first tool. When the operator changes the specification in the box to choose a different tool, the function of the communication module 602 provides a link to the domain in which the chosen tool is installed.

The source element lists a set of data contained in the DAG data 608, associated with the tool specified in the source tool combo box. By pulling down the list, one of the elements of the set of data listed can be selected.

The target tool specifies a second tool. When the specification in the box is changed to choose another tool, the function of the communication module 602 provides a link to the domain in which the chosen is installed.

The target element lists a set of data contained in the DAG data 608 relating to the tool specified in the target tool combo box. By pulling down the list, one of the elements of the set of data can be chosen.

Figure 11:
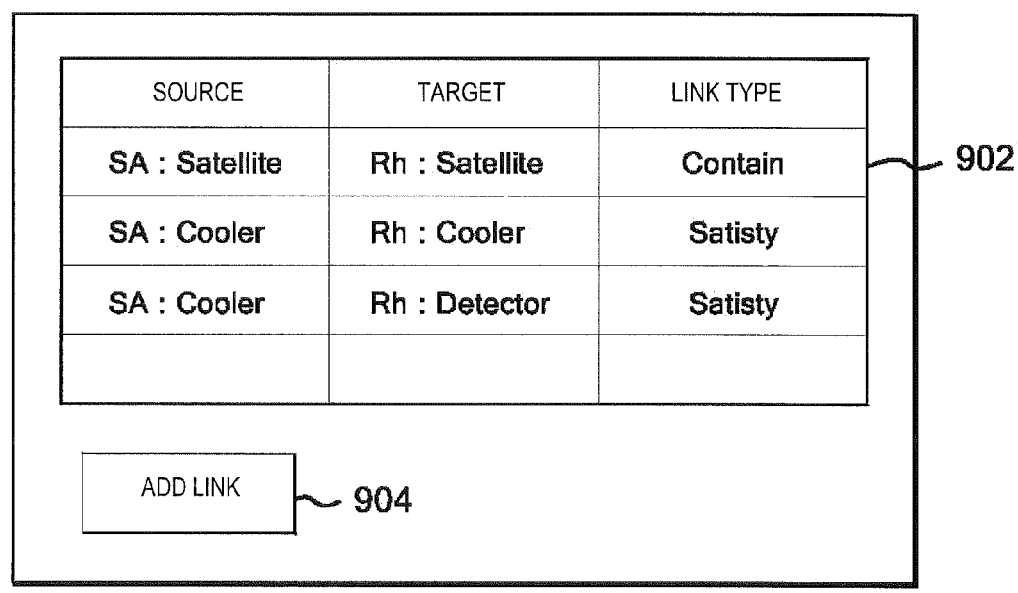
FIG. 11 is a diagram illustrating an exemplary GUI for a process providing an association.

The link type combo box is used for specifying a relation between the source element and the target element. While one of "Contain" and "Satisfy" can be chosen here, other relations can be included. When the operator chooses "Satisfy" and clicks on the "Create" button 1002, a relation having the source SA: Cooler, the target Rh: Detector and the link type Satisfy is generated and displayed in the view 902 as illustrated in FIG. 11. While the link type is not necessarily used in the present invention, the link type can be needed for other purposes. At this point, or upon completion of the associating process, the association input module 610 stores the generated associating data in the hard disk drive 508 as association data 612.

A process of the association graph generation module 614 will be described with reference to flowcharts in FIGS. 12 to 16. The process is started when the operator of the association information management computer 410 clicks on a given start button (not depicted) after association data 612 has been prepared.

Figure 12:
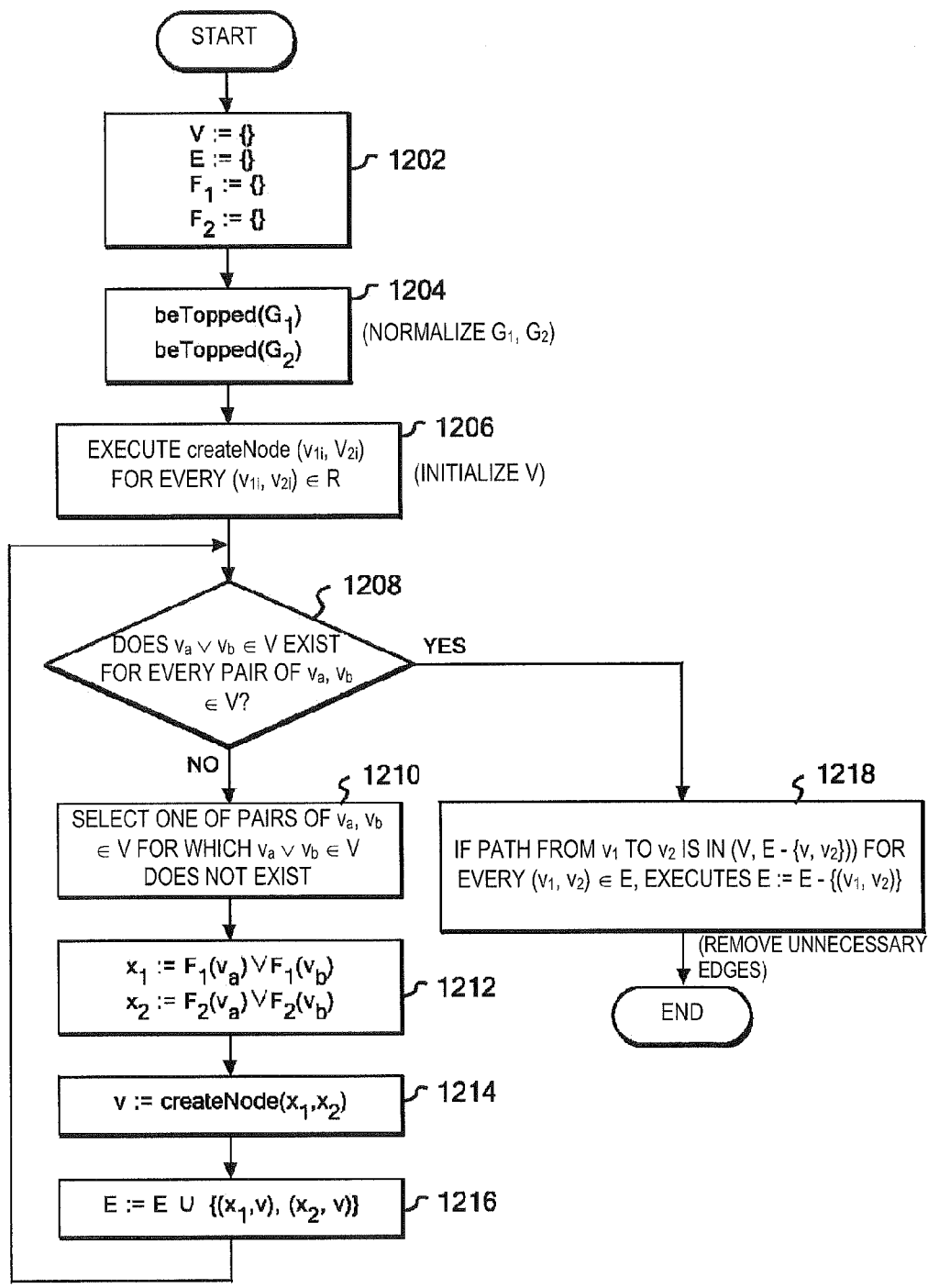
FIG. 12 illustrates a flowchart of a process for generating an association graph based on association information.

Inputs in the process in FIG. 12 are directed acyclic graphs $G_1=(V_1, E_1)$ and $G_2=(V_2, E_2)$, and $R=\{(v_{11}, v_{21}), \ldots, (v_{1m}, v_{2m})\} \subseteq V_1 \times V_2$, which is stored as the association data 612.

At step 1202, the association graph generation module 614 provides variables V, E, $F_1$, and $F_2$, which are sets for containing results of the process. At this point, the variables are set to null. In particular, $F_1$ represents mapping from elements of V to elements of $V_1$ and $F_2$ represents mapping from elements of V to elements of $V_2$.

At step 1204, the association graph generation module 614 calls a function, beTopped ( ) to normalize $G_1$ and $G_2$.

Figure 16:
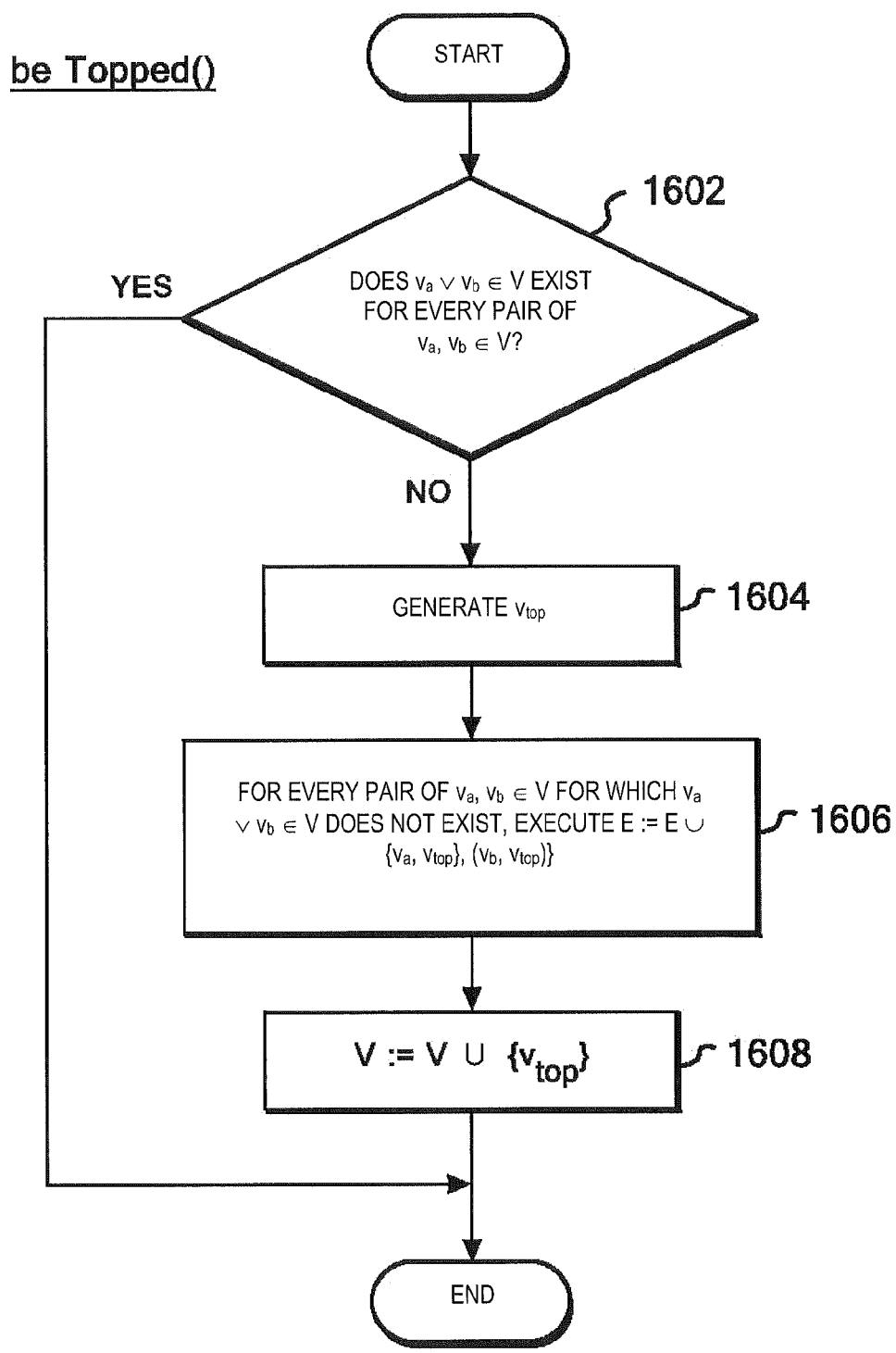
FIG. 16 illustrates a flowchart of a process of beTopped ( )

A process of beTopped ( ) will be described with reference to the flowchart in FIG. 16. The function beTopped ( ) receives a directed acyclic graph G as an input. At step 1602, determination is made as to whether or not $v_a \vee v_b$ exists for every pair of $v_a, v_b \in V$, where V is a set of nodes of the directed acyclic graph G.

Figure 13:
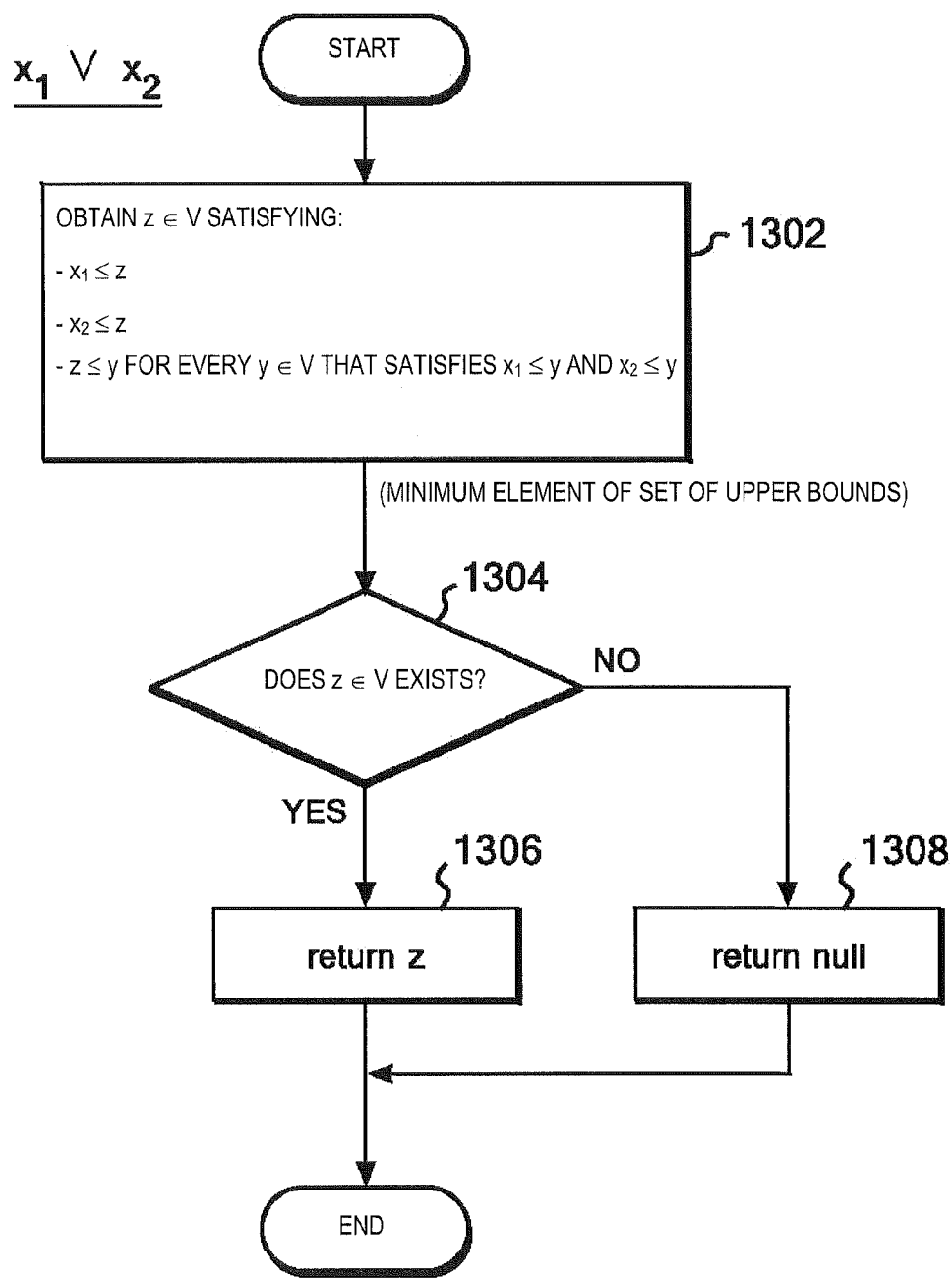
FIG. 13 illustrates a flowchart of a process of $x1 \vee x2$.

Here, the operation $\vee$ in $v_a \vee v_b$ is defined by the process of the flowchart in FIG. 13. Referring to FIG. 13, variables $x_1 \vee x_2$, will be described. At step 1302, $z \in V$ that satisfies the following conditions is determined:

$x_1 \leq z$
$x_2 \leq z$
$z \leq y$ for every $y \in V$ that satisfies $x_1 \leq y$, $x_2 \leq y$.

In other words, this is an operation for obtaining minimum-element node of upper bounds in the DAG of nodes $x_1$ and $x_2$.

If it is determined at step 1304 that such $z \in V$ exists, z is returned at step 1306 of the flowchart in FIG. 13; otherwise, null or an empty set is returned at step 1308.

Figure 14:
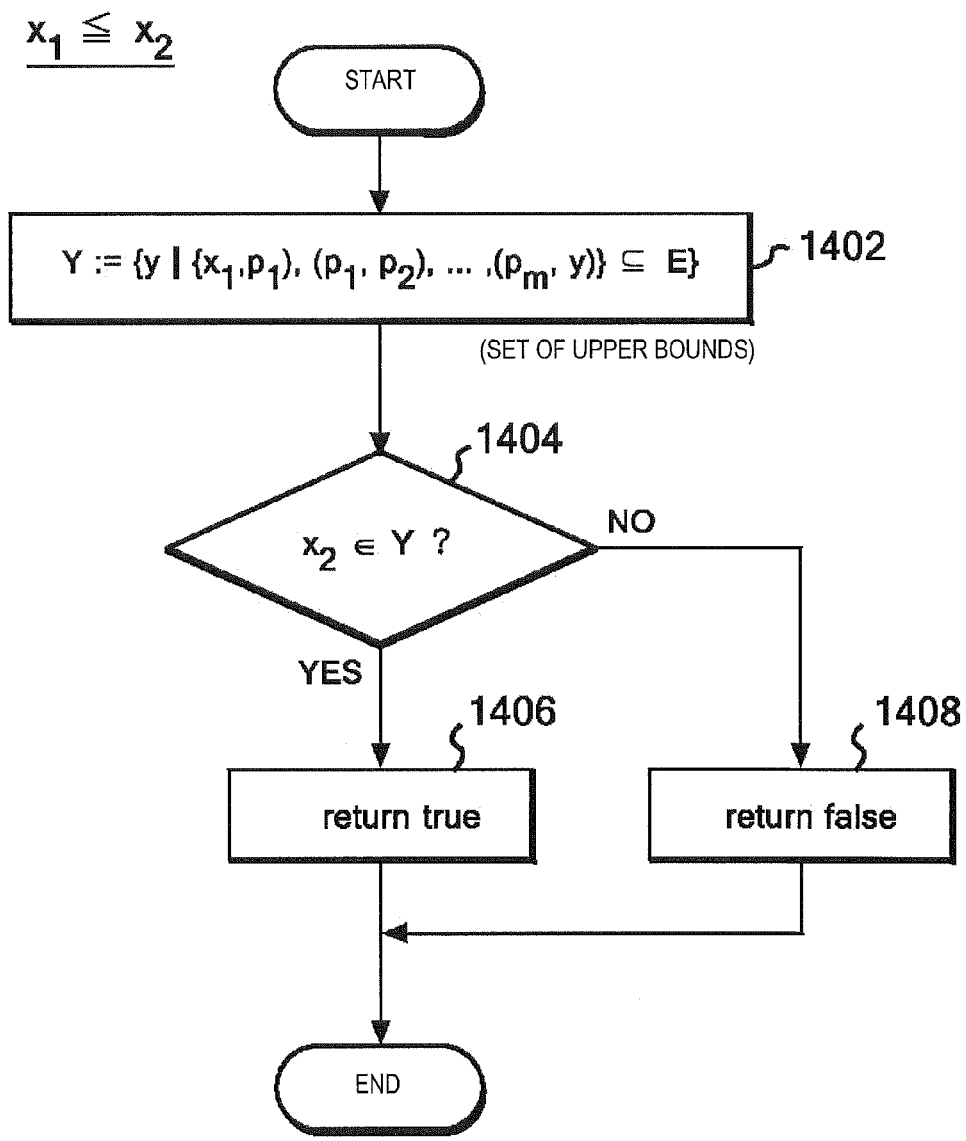
FIG. 14 illustrates a flowchart of a process of $x1 \leq x2$.

The operation of the operator $\leq$ in $x_1 \leq z$ given above is defined by the process of the flowchart in FIG. 14. Referring to FIG. 14, the variables $x_1 \leq x_2$ will be described. At step 1402, a set Y of nodes such that $Y:=\{y|(x_1, p_1), (p_1, p_2), \ldots, (p_m, y)\} \subseteq E\}$ is calculated, where $x_1 \in V$ and $x_2 \in V$. Here, Y is a set of y such that edges from $x_1$ to y are contained in a set E of edges in the graph G. In other words, Y is a set of upper bounds of $x_1$. If it is determined at step 1404 that $x_2$ is contained in Y, that is, $x_2$ is an upper bound of $x_2$, a true is returned at step 1406 of the flowchart in FIG. 14; otherwise, a false is returned at step 1408.

Up to this point, the definitions of the operations $x_1 \vee x_2$ and $x_1 \leq x_2$ have been described. Returning to FIG. 16, determination is made at step 1602 as to whether or not $v_a \vee v_b \in V$ exists for every pair of $v_a, v_b \in V$, where V is the set of nodes in the directed acyclic graph G. If so, beTopped ( ) determines that the rest of the process is not necessary, and therefore ends.

If it is determined $v_a \vee v_b \in V$ does not exist, beTopped ( ) generates a node, $v_{top}$, at step 1604, generates an edge, $E:=E \cup \{(v_a, v_{top}), (v_b, v_{top})\}\}$, for every pair of $v_a, v_b \in V$ for which $v_a \vee v_b \in V$ does not exist, adds the edge to E as an element at step 1606, and adds the generated node $v_{top}$ to V as an element.

Returning to step 1204 of FIG. 12, after normalization of $G_1$ and $G_2$ by beTopped ($G_1$) and beToppped ($G_2$) is completed, the association graph generation module 614 executes creteNode ($v_{1i}, v_{2i}$) for all elements of the ($v_{1i}, v_{2i}$) of the relation.

Figure 15:
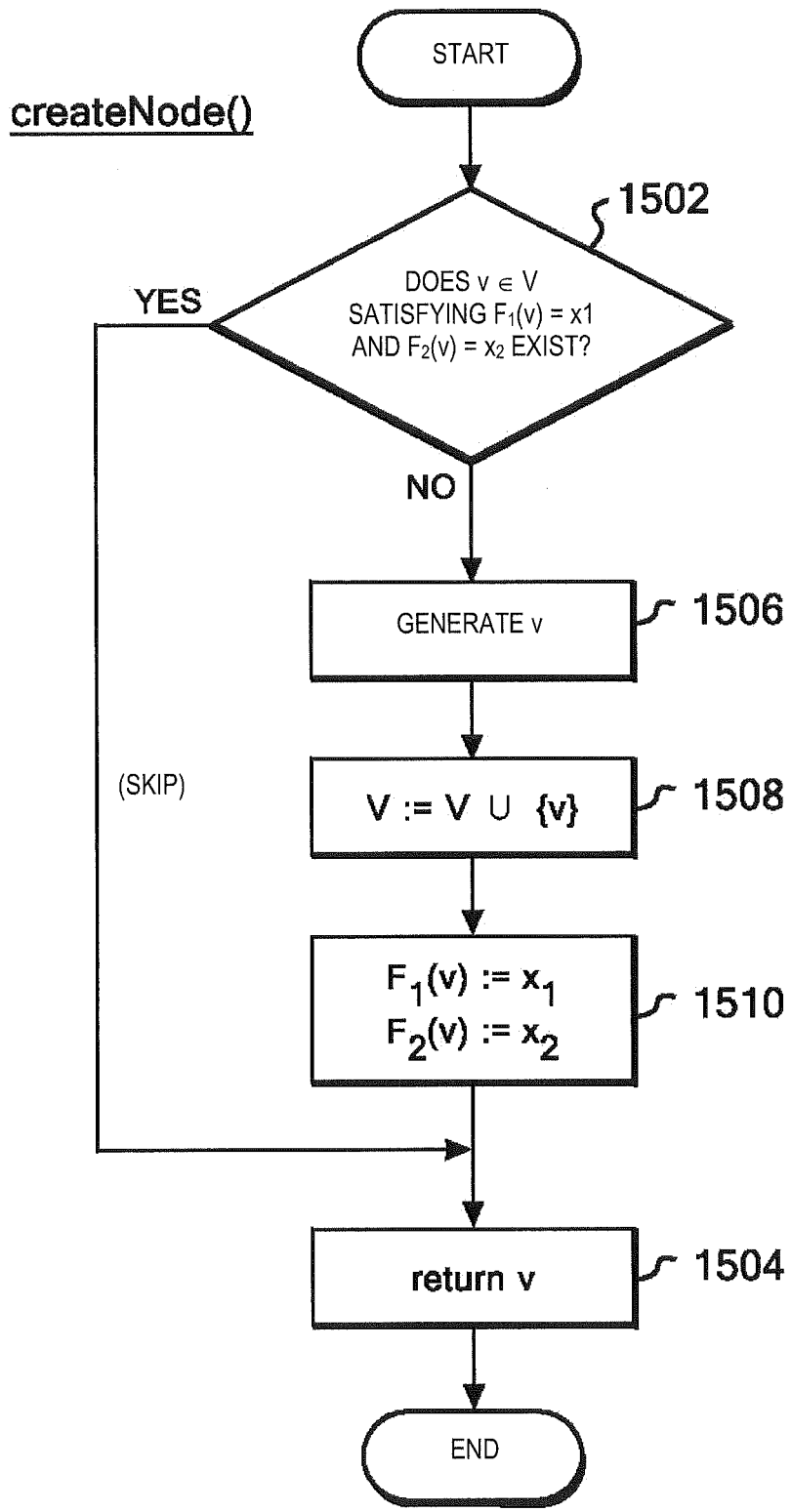
FIG. 15 illustrates a flowchart of a process of create Node ( )

FIG. 15 illustrates a flowchart of the process of create Node ( ) Here, createNode ($x_1, x_2$) will be described. At step 1502 in FIG. 15, createNode ( ) determines whether $v \in V$ that satisfies $F_1(v)=x_1$, $F_2(v)=x_2$ exists. If so, createNode ( ) simply returns v and then ends the process.

If there is not $v \in V$ that satisfies $F_1(v)=x_1$, $F_2(v)=x_2$, the process proceeds to step 1506, where createNode ( ) generates a node v, then adds v to V as an element of $V=V \cup \{v\}$ at step 1508, generates a link in $F_1$ and $F_2$ according to $F_1(v):=x1$, $F_2(v):=x_2$ at step 1510. Then createNode ( ) returns v and ends the process.

Returning to FIG. 12, the association graph generation module 614 determines at step 1208 whether or not $v_a \vee v_b \in V$ exists for every pair of $v_a, v_b \in V$. If not, the process proceeds to step 1210, where the association graph generation module 614 selects any one of the pairs of $v_a, v_b \in V$ for which $v_a \vee v_b \in V$ does not exist.

At step 1212, the association graph generation module 614 determines the values of $x_1$ and $x_2$ according to $x_1:=F_1(v_a) \vee F_1(v_b)$ and $x_2:=F_2(v_a) \vee F_2(v_b)$.

At step 1214, the association graph generation module 614 uses the values of $x_1$ and $x_2$ determined at step 1212 to execute v:=createNode ($x_1, x_2$). A node v generated in this way is referred to as a join node. A join node can be said to be a node that links nodes positioned upstream of nodes $x_1$ and $x_2$ in the DAG.

At step 1216, the association graph generation module 614 uses the values of $x_1$ and $x_2$ determined at step 1212 and the value of v determined at step 1214 to execute $E:=E \cup \{(x_1, v), (x_2, v)\}$ and adds an edge. The association graph generation module 614 then returns to step 1208 and repeats the sequence of steps 1210, 1212, 1214 and 1216 until it finds that $v_a \vee v_b \in V$ exists for all pairs $v_a, v_b \in V$.

When it is found at step 1208 that $v_a \vee v_b \in V$ exists for all pairs $v_a, v_b \in V$, the process proceeds to step 1218, where unnecessary edges are removed. For every $(v_1, v_2) \in E$, if a path from $v_1$ to $v_2$ is in $(V, E-\{(v_1, v_2)\}$, edge $(v_1, v_2)$ is removed from E by $E:=E-\{(v_1, v_2)\}$ then the process ends. The association graph (V, E) thus generated is displayed by the display module 618 in an appropriate view on the display 114.

Figure 17:
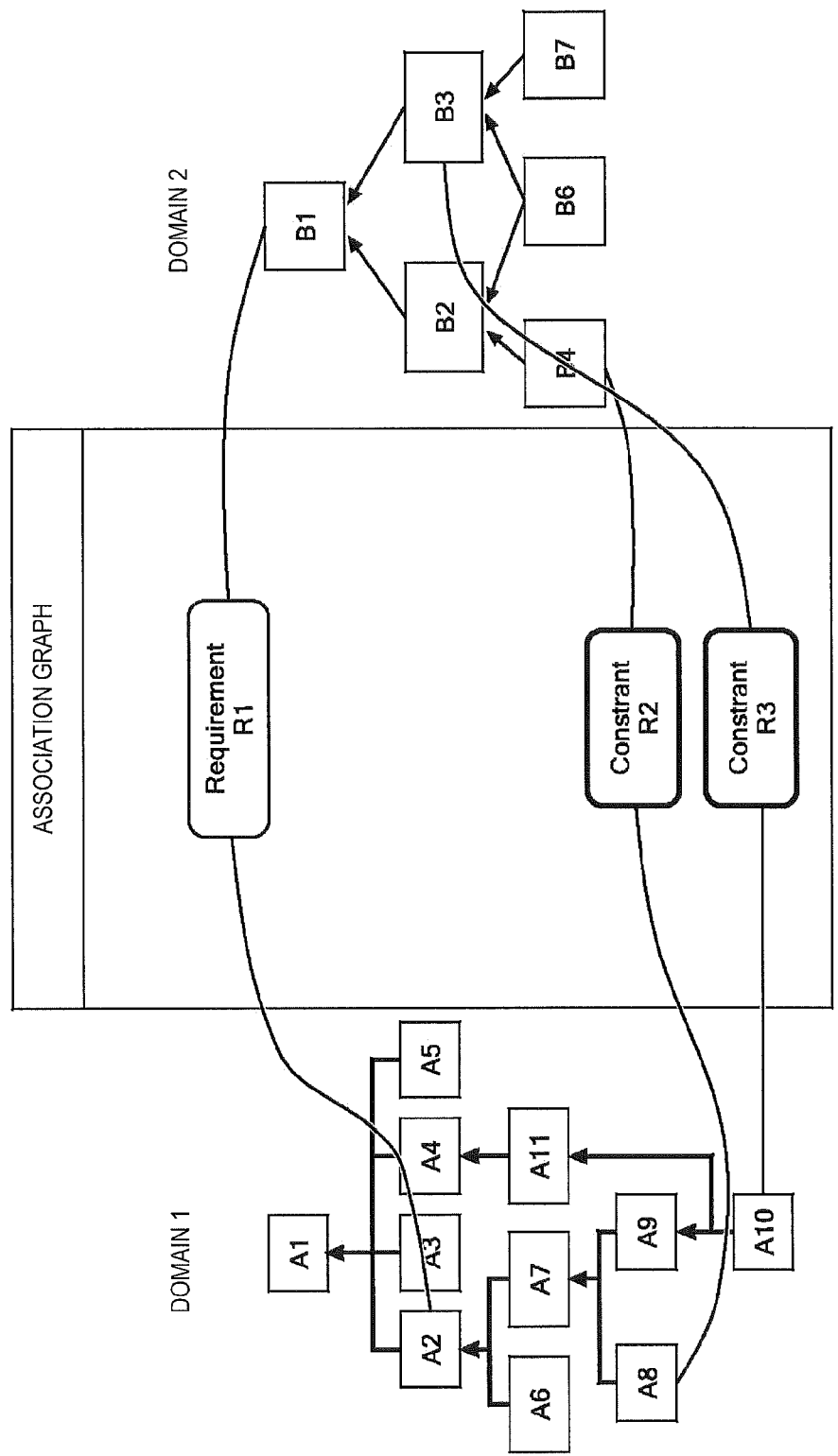
FIG. 17 is a diagram illustrating an exemplary process for generating an association view (graph)

The process of the present invention will be described more specifically with respect to an example. It is assumed in FIG. 17 that data A1 to A11 of domain 1 and data B1 to B7 of domain 2 have been imported in the association information management computer 410 by the processes illustrated at steps 802 to 808 in FIG. 8. Furthermore, the data of the domains have been associated by the associating process illustrated at step 810 of FIG. 8. The relations R1, R2 and R2 thus generated are also illustrated. While not used in the present invention, "Requirement" and "Constraint" displayed on the relations represent the types of the relations. At the stage in FIG. 17, the association graph generation module 614 selects a pair of relation nodes for which a join has not been constructed.

Figure 18:
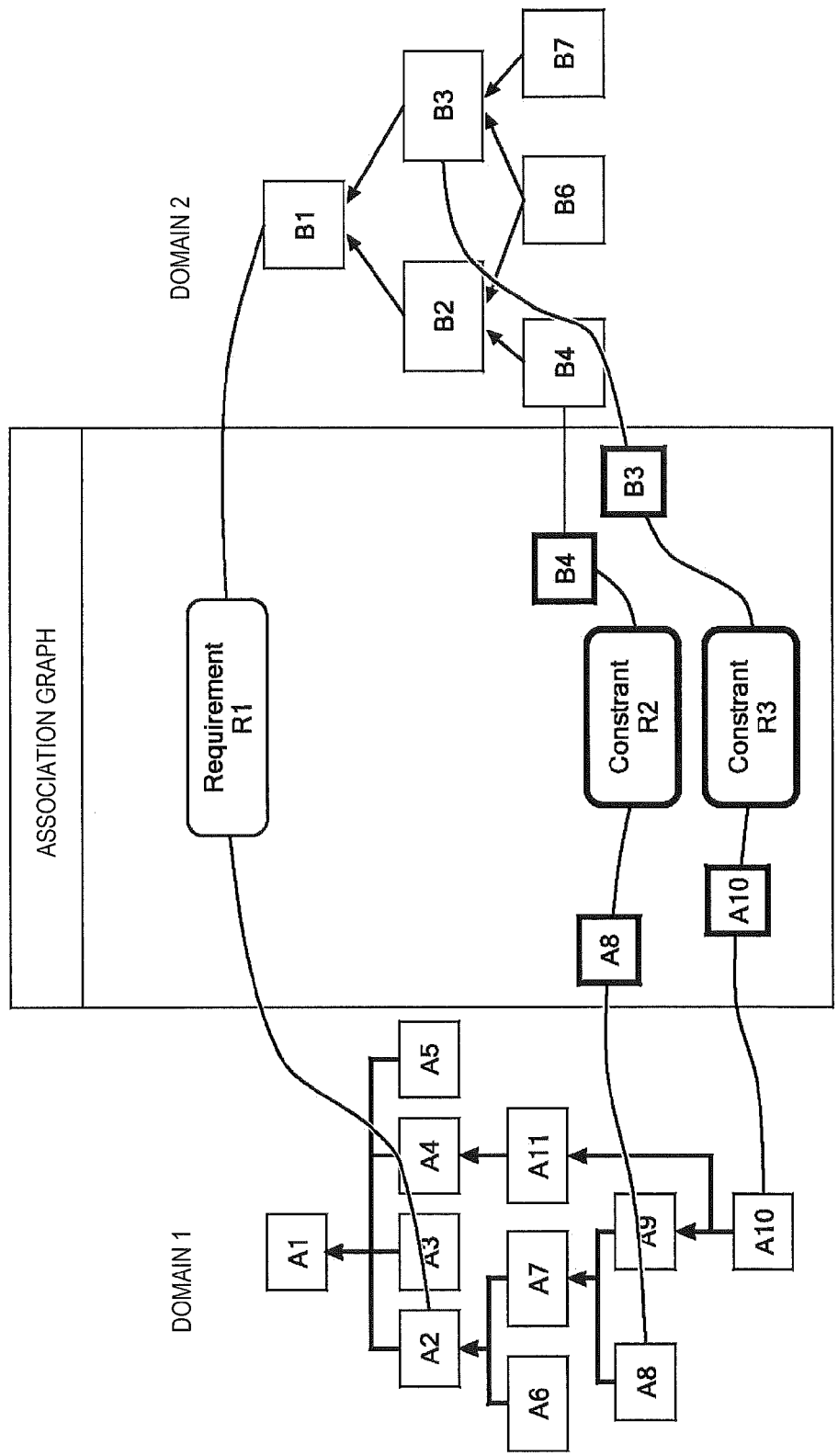
FIG. 18 is a diagram illustrating an exemplary process for generating an association view (graph)

In FIG. 18, the association graph generation module 614 then generates, that is, imports in the relation view, nodes on which the relations are based according to step 1206.

Figure 19:
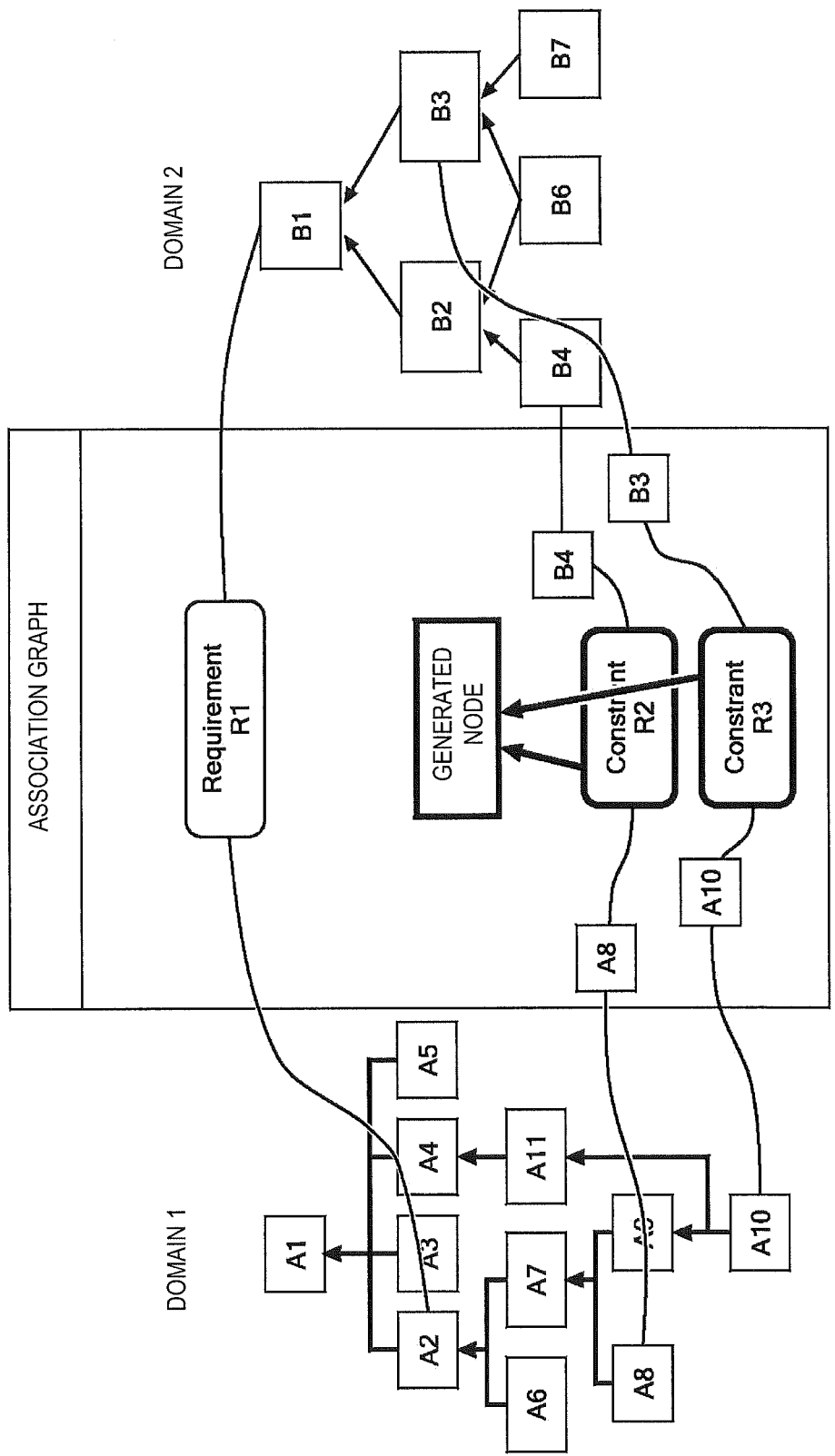
FIG. 19 is a diagram illustrating an exemplary process for generating an association view (graph)

In FIG. 19, the association graph generation module 614 generates a node to connect (join) R2 with R3. This corresponds to the operations at steps 1214 and 1216.

Figure 20:
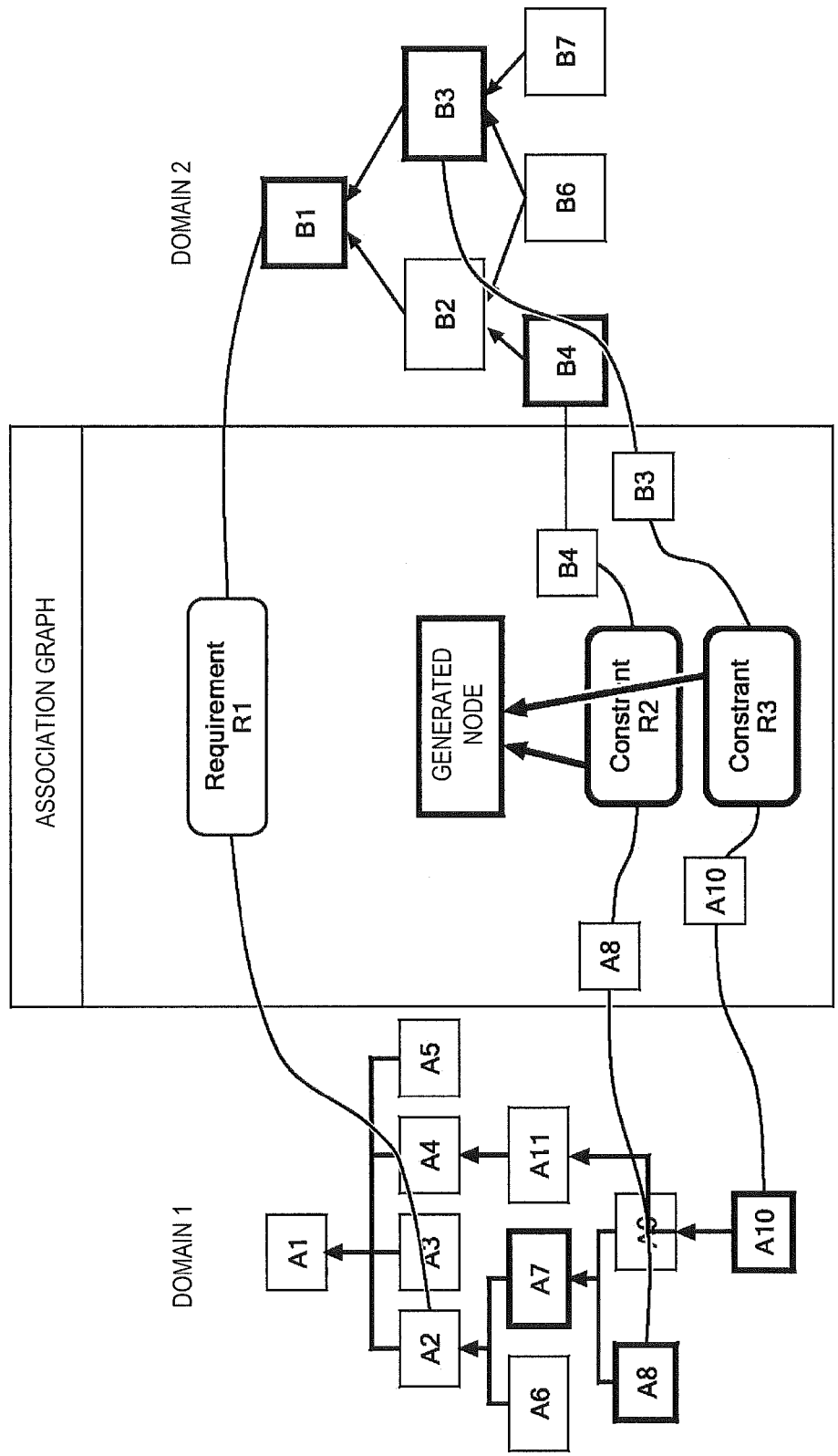
FIG. 20 is a diagram illustrating an exemplary process for generating an association view (graph)

In FIG. 20, the association graph generation module 614 calculates connection relations for imported nodes. Here, a connection relation between B2 and B3 thorough B1 and a connection relation between A8 and A 10 through A7 are calculated.

Figure 21:
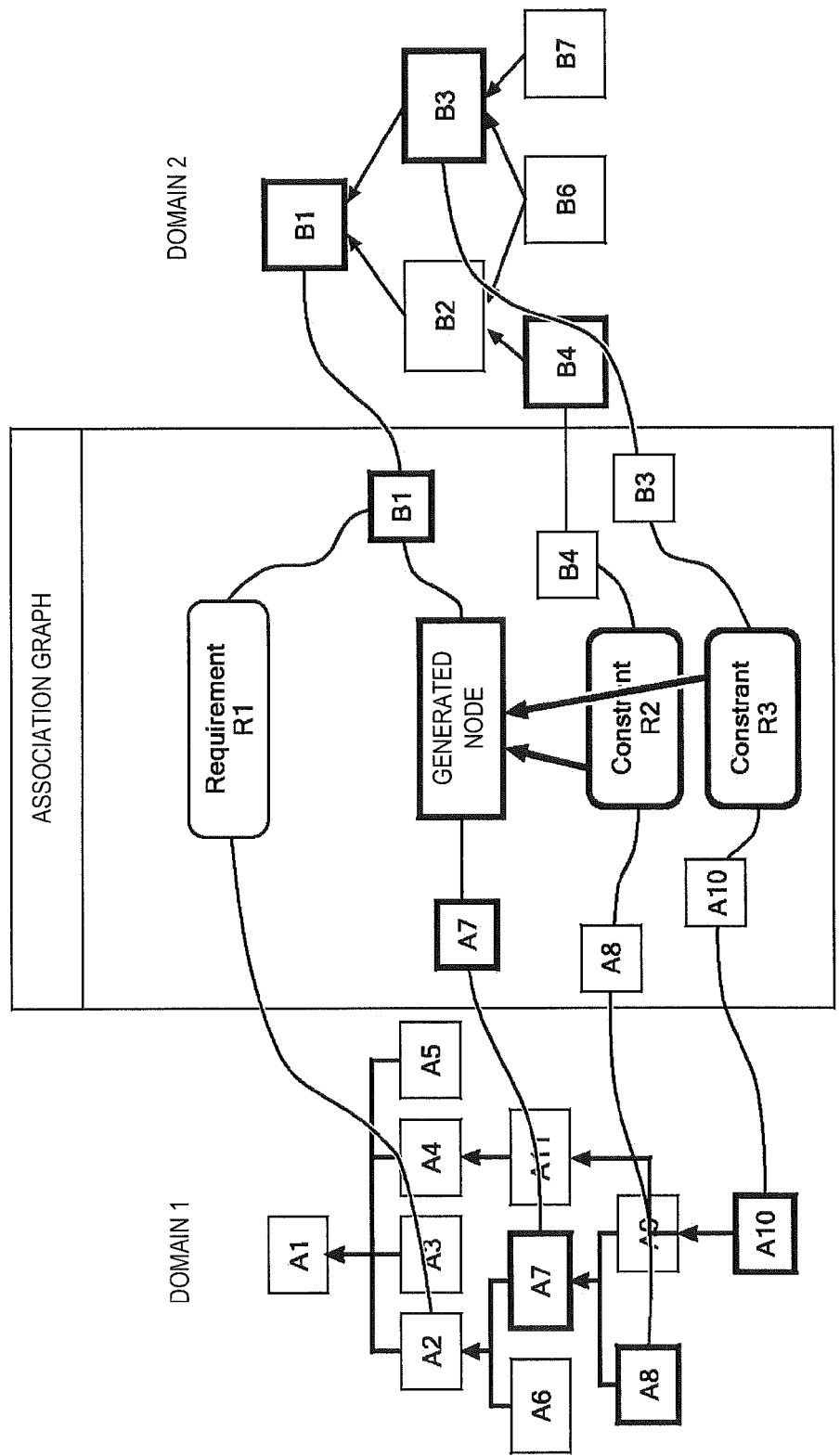
FIG. 21 is a diagram illustrating an exemplary process for generating an association view (graph)

In FIG. 21, the association graph generation module 614 imports node B1 to be connected and associates node B1 with the generated node. Similarly, the association graph generation module 614 also imports node A7 and associates node A7 with the generated node.

Figure 22:
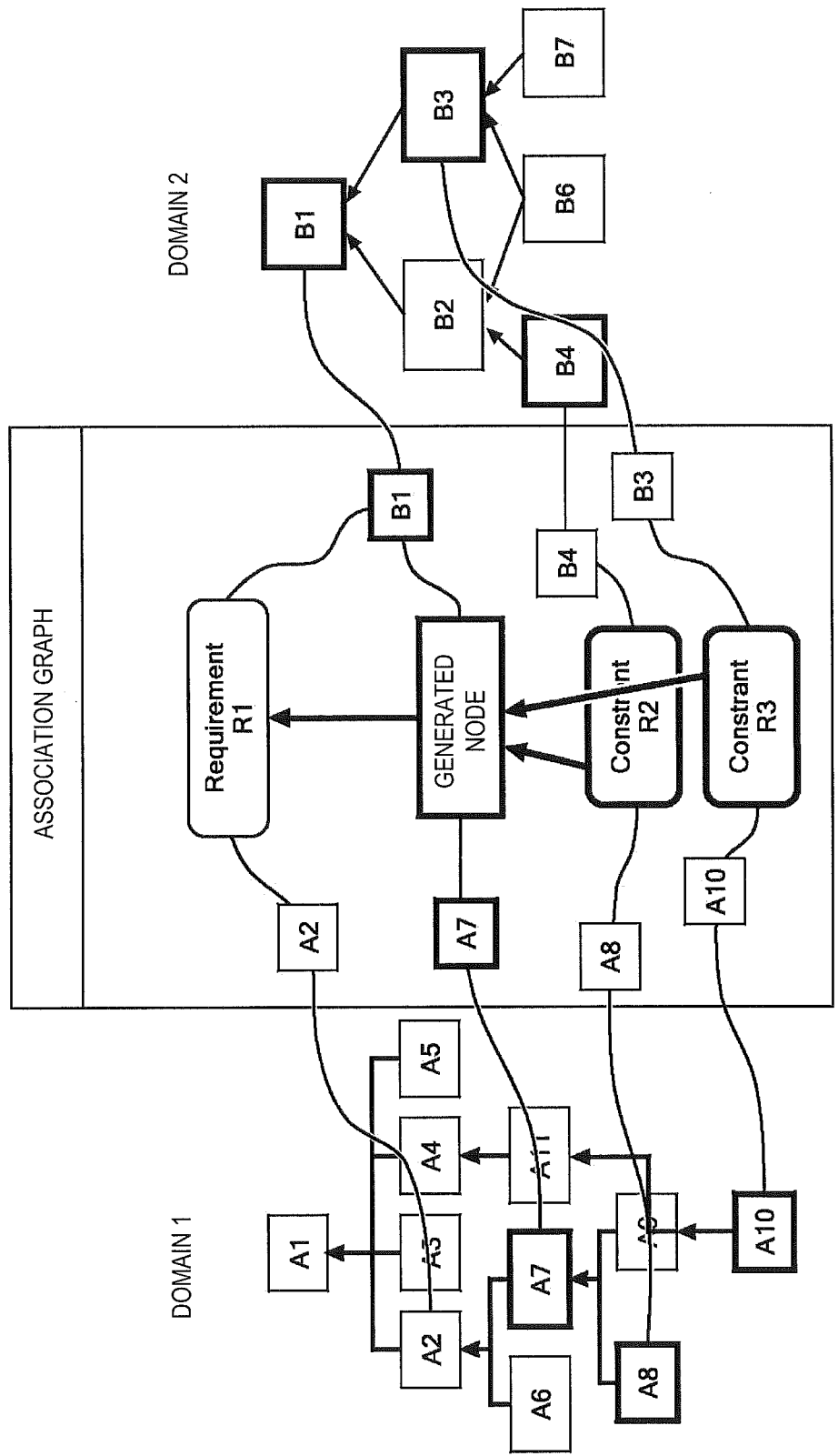
FIG. 22 is a diagram illustrating an exemplary process for generating an association view (graph)

The association graph generation module 614 repeats the process until all relation nodes are connected through join nodes as illustrated in FIG. 22.

Figure 23:
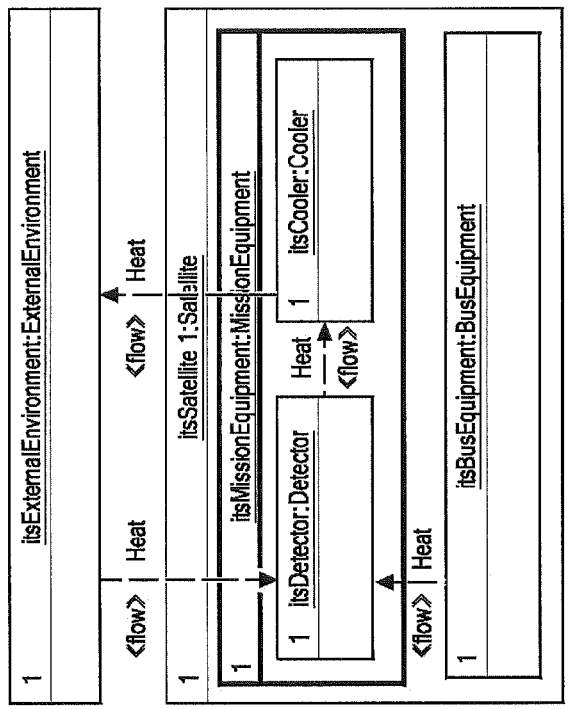
FIG. 23 is a diagram illustrating an example of management of associations between a thermal design model and a structural design chart for an artificial satellite.
Figure 23:
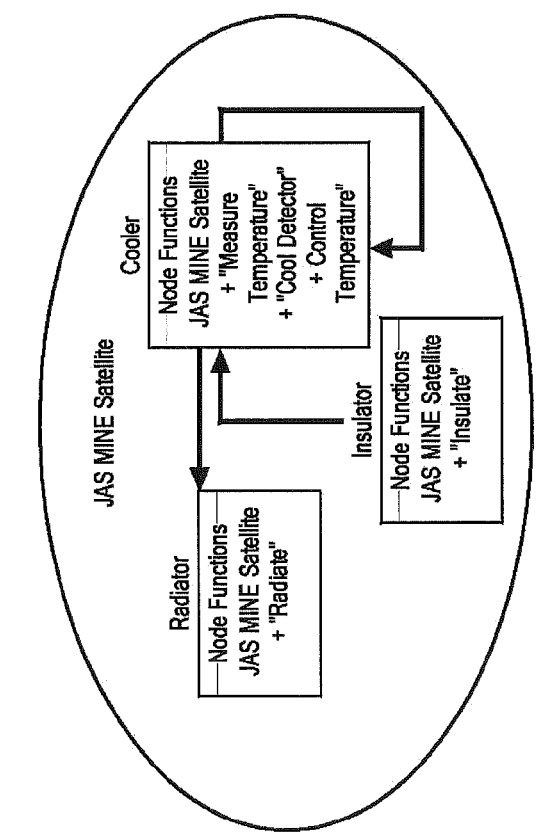
Figure 24:
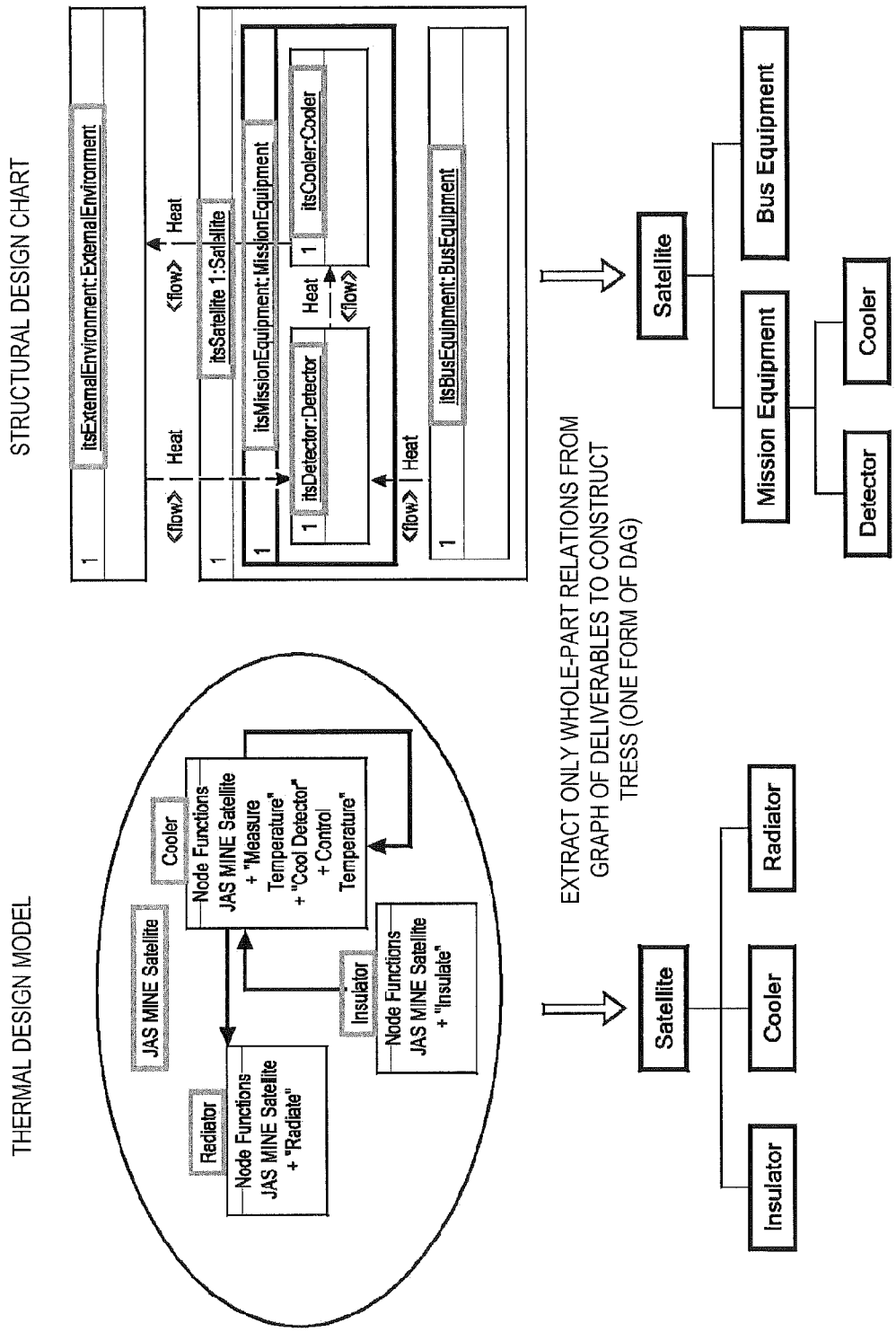
FIG. 24 is a diagram illustrating an example of management of associations between the thermal design model and the structural design chart for the artificial satellite.

The process and advantageous effects of the present invention will be described below with respect to management of association between a thermal design model and a structural design chart of an artificial satellite illustrated in FIG. 23 by way of example. Development of a complex and large-scaled system like an artificial satellite involves experts in various fields. It is assumed in this case that experts in individual fields, such as experts in thermal design and experts in structural design, for example, produce deliverables by using methods and tools specific to their fields.

Suppose that there is a demand to efficiently manage associations between the thermal design model and the structural design chart. According to the present invention, first the process from step 802 to step 808 in FIG. 8 is performed to import data from both of the thermal design model and the structural design chart to construct directed acyclic graphs.

Figure 25:
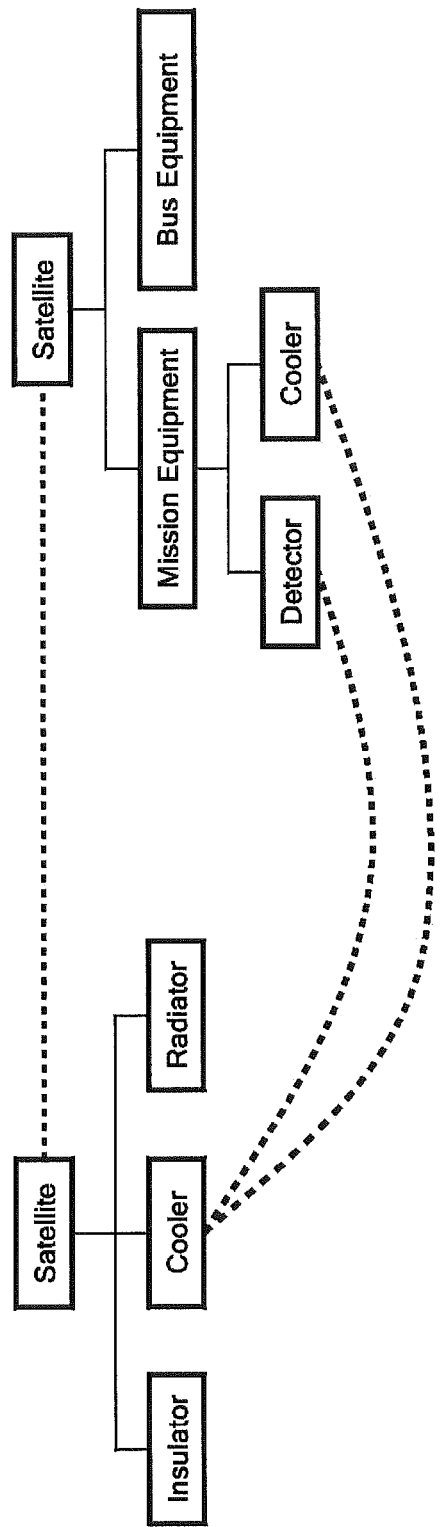
FIG. 25 is a diagram illustrating an example of management of associations between the thermal design model and the structural design chart for the artificial satellite.

According to step 810 in FIG. 8, the operator of the association information management computer 410 associates the data from the thermal design model with the data from the structural design chart as illustrated in FIG. 25. It is difficult to choose appropriate elements of data to be associated with each other because the amounts of data in the domains are typically huge. In addition, in order for an operator to comprehend the meanings of the associations, the operator needs to comprehend data from multiple domains to be associated. However, it is difficult to gain expertise in both fields. Accordingly, the operator may not be able to determine whether or not the data are appropriately associated.

Figure 26:
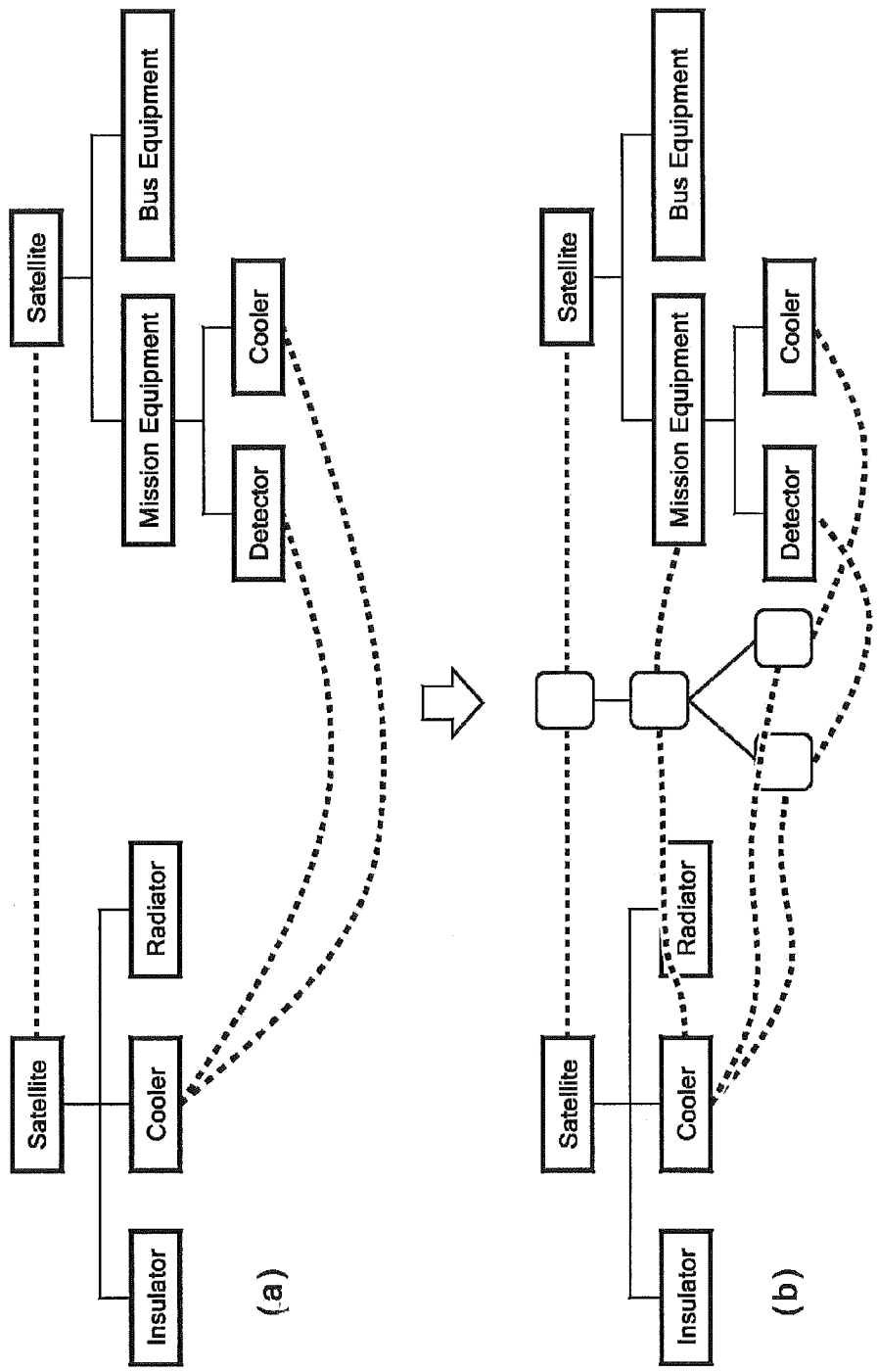
FIG. 26 is a diagram illustrating an example of management of associations between the thermal design model and the structural design chart for the artificial satellite.

Therefore, according to the present invention, the association graph generation module 614 generates an association graph illustrated in FIG. 26 (b) from association data illustrated in FIG. 26 (a).

The association graph thus generated is a simplified version of the original graph of each domain, which retains relations represented in the original graph. Therefore the association graph allows the operator to comprehend the meanings of associations without referring to data of the other domain.

For example, when the operator wants to associate "Cooler" in the graph in the left-hand part with a new element in the graph in the right-hand part, the operator can see that the operator needs only to select a node under "Mission Equipment". In this way, the scope of considerations is narrowed down.

Furthermore, since potential associations are extracted by using the algorithm to generate join nodes, the number of inputs of associations by an operator can be reduced.

Moreover, appropriateness of associations can be determined from the hierarchy in the generated graph. Specifically, if elements are inappropriately associated with each other, the number of levels of the hierarchy is reduced. If the operator determines that an association is not appropriate from the hierarchy, the operator can restart the process from the process of the flowchart in FIG. 8.

While the algorithm for generating an association graph between two domains is used in the embodiment described above, the algorithm can be extended to an algorithm that generates an association graph among n domains as described below.

While the correspondence $R=\{(v_{11}, v_{21}), \ldots, (v_{1m}, v_{2m})\} \subseteq V_1 \times V_2$ is used in the embodiment described above, the correspondence is first extended to $R=\{(v_{11}, \ldots, v_{n1}), \ldots, (v_{1m}, \ldots, v_{nm})\} \subseteq V_1 \times \ldots \times V_n$.

Then, $F_1$ and $F_2$ in the process illustrated in the flowchart of FIG. 12 are extended as $F_1, \ldots, F_n$, the arguments $x_1$ and $x_2$ in the subroutine createNode ( ) are increased in number to $x_1, \ldots, x_n$, and $F_1, \ldots, F_n$ are generated where $F_1$ and $F_2$ were generated. Furthermore, the binary operator $\vee$ in $x_1 \vee x_2$ is extended to an n-ary operator.

While the present invention has been described with respect to a particular embodiment, the present invention is not limited to any specific operating system or platform and can be implemented on any computer systems.

The present invention is not limited to particular domains or tools but is generally applicable.

What is claimed is:

1. A computer implemented relation information constructing method for constructing, by computer processing, relation information between a plurality of data elements structured in a first directed acyclic graph (DAG) in a first domain and a plurality of data elements structured in a second DAG in a second domain on the basis of a preassigned relation between data elements, the method comprising:

accessing the plurality of data elements in the first directed acyclic graph (DAG) in the first domain and the plurality of elements in the second DAG in the second domain, wherein the first DAG and the second DAG;

importing, using a processing device, data related to the first DAG from the first domain and data related to the second DAG from the second domain in order to generate a relation graph;

identifying assignment of a relation between a node $v_a$ of the first DAG and a node $v_b$ of the second DAG;

generating, in response to the relation between the node $v_a$ and the node $v_b$, a join node to connect the first DAG to the second DAG, wherein the join node is positioned between the node $v_a$ and the node $v_b$ in the relation graph, and wherein the join node is a node linking a node positioned upstream of the node $v_a$ in the first DAG to a node positioned upstream of the node $v_b$ in the second DAG; and generating one or more additional join nodes, wherein the generating comprises, as long as there is a pair of node $v_a$ of the DAG of the first domain and node $v_b$ of the DAG of the second domain that do not have a join node, generating a join node v between $v_a$ and $v_b$ in the relation graph, and generating an edge $(v_a, v)$ and an edge $(v_b, v)$ in the relation graph;

wherein, after generating the one or more additional join nodes, the first DAG is independently manageable by a first tool configured for the first domain, the second DAG is independently manageable by a second tool configured for the second domain and distinct from the first tool, and a third domain comprising the one or more additional join nodes is manageable by a centralized tool.

2. The method according to claim 1, wherein the data elements comprises one or more of Systems Modeling Language (SysML) data elements and Uniform Modeling Language (UML) data elements.

3. A computer program product comprising a non-transitory, computer readable medium having instructions stored thereon that, when executed, implement a relation information constructing method for constructing relation information between a plurality of data elements structured in a first directed acyclic graph (DAG) in a first domain and a plurality of data elements structured in a second DAG in a second domain on the basis of a preassigned relation between data elements, the method comprising:

accessing the plurality of data elements in the first directed acyclic graph (DAG) in the first domain and the plurality of elements in the second DAG in the second domain, wherein the first DAG and the second DAG are distinct from each other and non-connected;

importing data related to the first DAG from the first domain and data related to the second DAG from the second domain in order to generate a relation graph;

identifying assignment of a relation between a node $v_a$ of the first DAG and a node $v_b$ of the second DAG;

generating, in response to the relation between the node $v_a$ and the node $v_b$, a join node to connect the first DAG to the second DAG, wherein the join node is positioned between the node $v_a$ and the node $v_b$ in the relation graph, and wherein the join node is a node linking a node positioned upstream of the node $v_a$ in the first DAG to a node positioned upstream of the node $v_b$ in the second DAG; and generating one or more additional join nodes, wherein the generating comprises, as long as there is a pair of node $v_a$ of the DAG of the first domain and node $v_b$ of the DAG of the second domain that do not have a join node, generating a join node v between $v_a$ and $v_b$ in the relation graph, and generating an edge $(v_a, v)$ and an edge $(v_b, v)$ the relation graph;

wherein, after generating the one or more additional join nodes, the first DAG is independently manageable by a first tool configured for the first domain, the second DAG is independently manageable by a second tool configured for the second domain and distinct from the first tool, and a third domain comprising the one or more additional join nodes is manageable by a centralized tool.

4. The computer program product according to claim 3, wherein the data elements comprise one or more of Systems Modeling Language (SysML) data elements and Uniform Modeling Language (UML) data elements.

5. A system for constructing relation information between data of different domains from data stored in computers of a plurality of domains, the system comprising:

a storage device; and a processing device configured to:

import the data from a computer of any of the domains and storing the data in the storage device;

transform the imported data from a first domain into a first directed acyclic graph (DAG);

transform the imported data from a second domain into a second DAG;

allow a user to provide an association between the first DAG and the second DAG and store the association in the storage device;

identify assignment of a relation between a node $v_a$ of the first DAG and a node $v_b$ of the second DAG;

generate, in response to the relation between the node $v_a$ and the node $v_b$, a join node to connect the first DAG to the second DAG, wherein the join node is positioned between the node $v_a$ and the node $v_b$ in the relation graph, and wherein the join node is a node linking a node positioned upstream of the node $v_a$ in the first DAG to a node positioned upstream of the node $v_b$ in the second DAG; and generate one or more additional join nodes, wherein the generating comprises, as long as there is a pair of node $v_a$ of the DAG of the first domain and node $v_b$ of the DAG of the second domain that do no have a join node, generating a join node v between $v_a$ and $v_b$ in the relation graph; and generate an edge $(v_a, v)$ and an edge $(v_b, v)$ in the relation graph;

wherein, after generating the one or more additional join nodes, the first DAG is independently manageable by a first tool configured for the first domain, the second DAG is independently manageable by a second tool configured for the second domain and distinct from the first tool, and a third domain comprising the one or more additional join nodes is manageable by a centralized tool.

6. The system according to claim 5, wherein the data elements comprise one or more of Systems Modeling Language (SysML) data elements and Uniform Modeling Language (UML) data elements.

\* \* \* \* \*